US007126967B2

(12) United States Patent
Sönning et al.

(10) Patent No.: US 7,126,967 B2
(45) Date of Patent: Oct. 24, 2006

(54) TIME-ALIGNMENT APPARATUS AND METHOD FOR PROVIDING DATA FRAMES OF A PLURALITY OF CHANNELS WITH PREDETERMINATED TIME-OFFSETS

(75) Inventors: Raimund Sönning, Rathsbergstrasse (DE); Gian Huaman-Bollo, Avenariusstrasse (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

(21) Appl. No.: 10/873,171

(22) Filed: Jun. 23, 2004

(65) Prior Publication Data
US 2004/0228338 A1    Nov. 18, 2004

Related U.S. Application Data

(63) Continuation of application No. 09/667,529, filed on Sep. 22, 2004, now Pat. No. 6,781,976.

(30) Foreign Application Priority Data
Sep. 28, 1999    (EP)    .................. 99119008

(51) Int. Cl.
 *H04L 12/28*    (2006.01)
 *H04J 3/06*    (2006.01)
(52) U.S. Cl. ............... 370/510; 370/512; 370/412; 370/413; 370/395.7
(58) Field of Classification Search ........... 370/400, 370/412, 350, 335, 381, 382, 383, 503, 506, 370/509, 510, 512, 411, 413, 329, 328, 395.71, 370/395.7
See application file for complete search history.

(56) References Cited

U.S. PATENT DOCUMENTS

| 5,355,515 | A | * | 10/1994 | Sicher .................. 455/438 |
| 5,586,119 | A | | 12/1996 | Scribano et al. |
| 5,684,794 | A | | 11/1997 | Lopez et al. |
| 5,793,772 | A | | 8/1998 | Burke et al. |

(Continued)

FOREIGN PATENT DOCUMENTS

WO    98/59443    12/1998

OTHER PUBLICATIONS

Patent Abstracts of Japan, 08037657, Jun. 2, 1996.

*Primary Examiner*—Hanh Nguyen
(74) *Attorney, Agent, or Firm*—Nixon & Vanderhye P.C.

(57) ABSTRACT

The invention relates to a time-alignment apparatus and a time-alignment method of a transmitter (TX) of a telecommunication system TELE. Successive data frames (ch1/0, ch2/0, ch3/0, ch4/0, ch8/0, ch300/0) are written to one or two frame memories (RAM1, RAM2) starting at a respective frame start write address (FRST-ADR$_{chy}$). A third frame memory (RAM3) having a read state is read out in the column direction such that one data symbol of each storage resource ($RES_1$, $RES_2$ ... $RES_{300}$) can be output to a modulator unit (BBTX) of the transmitter (TX). The read/write state (WR/RD) of the three frame memories (RAM1, RAM2, RAM3) is cyclically switched through a first to third alignment mode (M1, M2, M3) such that always a first write state memory (RAM1) and a second write state memory (RAM2) are provided. An interleaving process can be carried out together with the time-offset adjustment if the storage resource is constituted by an interleaving matrix. An efficient usage of storage space is obtained if the data bits forming one data symbol are stored together at one memory location of the respective storage resource. The invention is particularly relevant for a CDMA telecommunication system, in order to minimize the interference between the channels.

24 Claims, 11 Drawing Sheets

U.S. PATENT DOCUMENTS

| | | |
|---|---|---|
| 6,134,233 A | 10/2000 | Kay |
| 6,243,369 B1 | 6/2001 | Grimwood et al. |
| 6,578,092 B1 | 6/2003 | Lau et al. |
| 6,590,881 B1 | 7/2003 | Wallace et al. |
| 6,665,308 B1 * | 12/2003 | Rakib et al. ............... 370/441 |
| 6,717,933 B1 * | 4/2004 | Sonning et al. ............. 370/342 |
| 6,771,670 B1 * | 8/2004 | Pfahler et al. .............. 370/503 |
| 6,781,976 B1 * | 8/2004 | Sonning et al. ............. 370/335 |
| 6,941,381 B1 * | 9/2005 | McClary et al. ............ 709/237 |

* cited by examiner

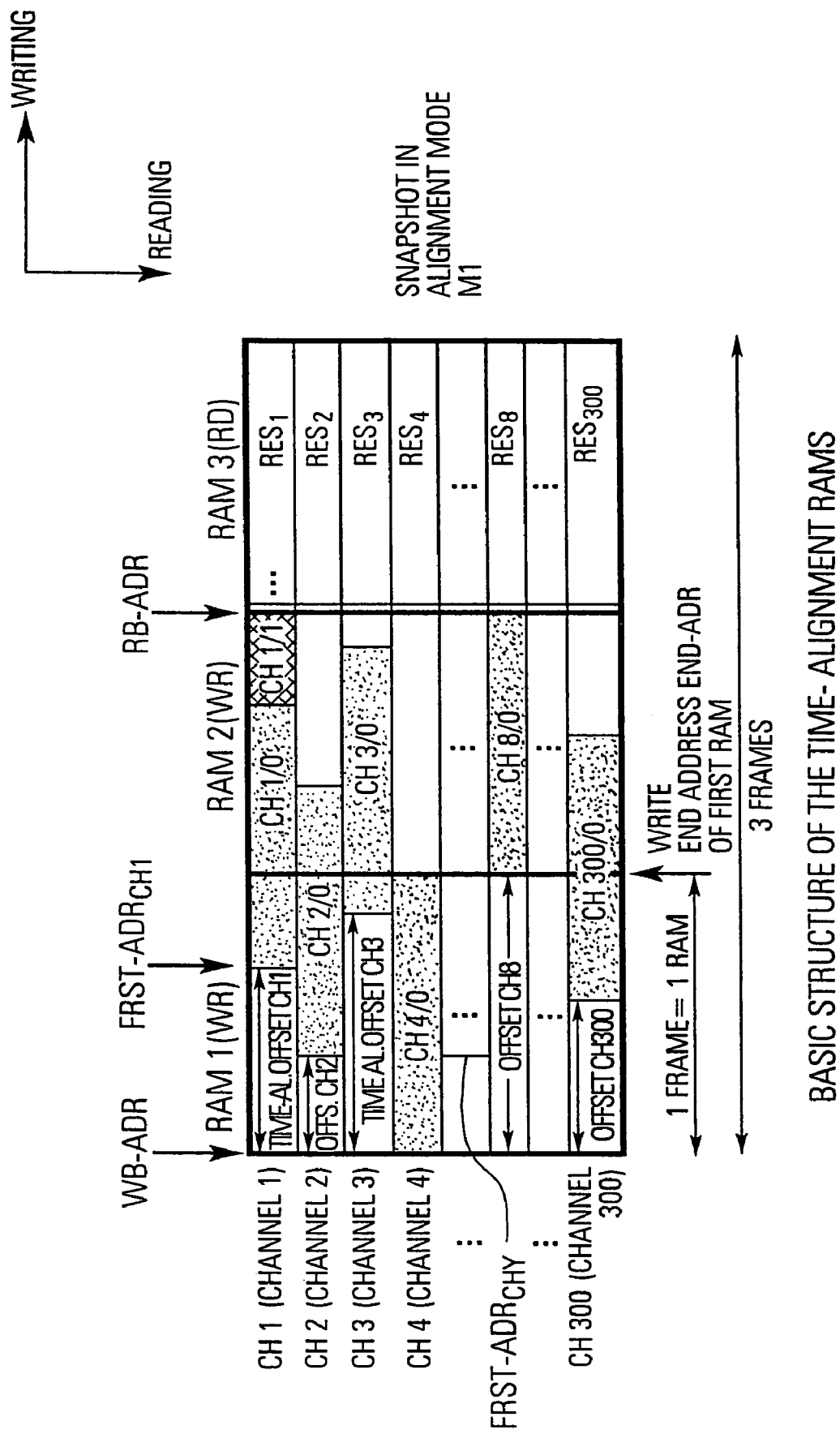

FIG. 2-3
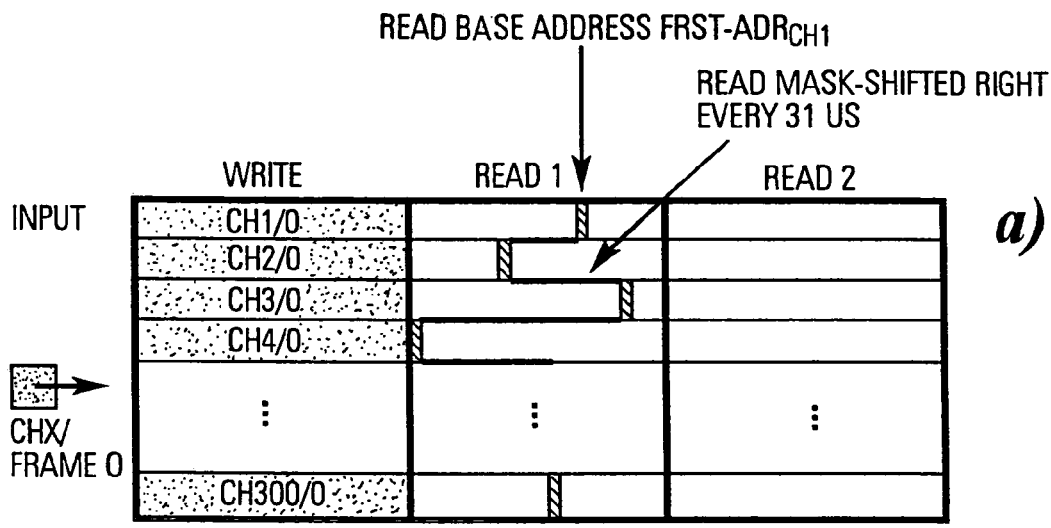
a)
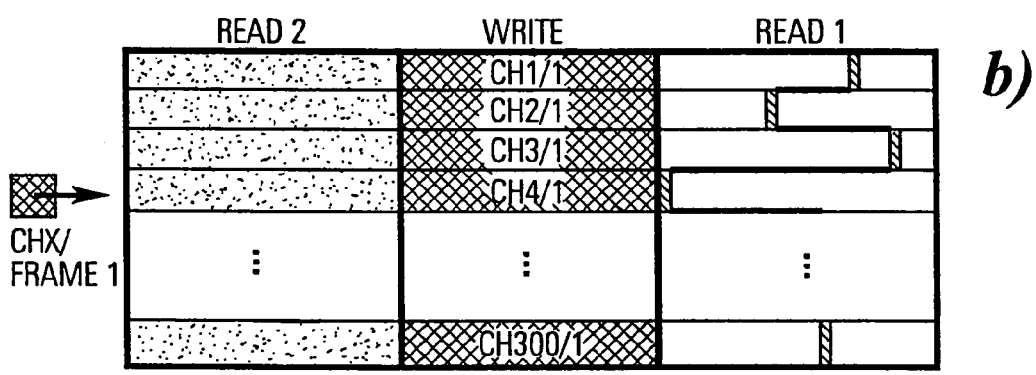
b)
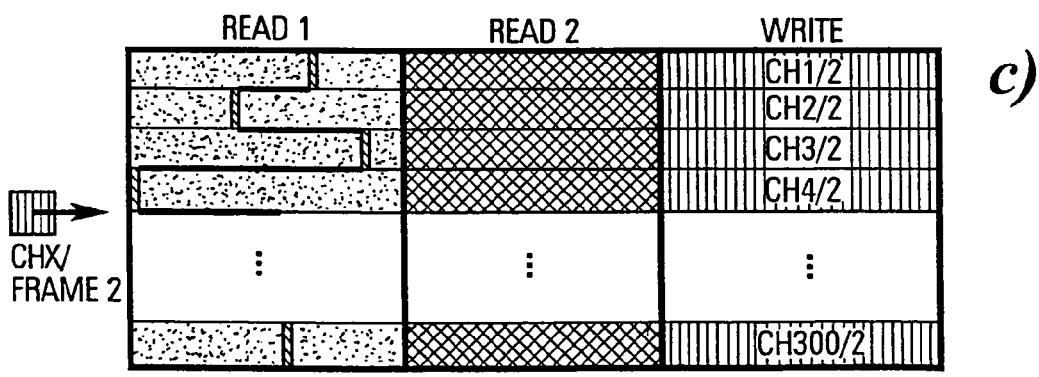
c)

*a)*

*b)*

*c)* a)

b)

CONVENTIONAL INTERLEAVING MATRIX
c)

FILLING THE RECOURCE WITHOUT INTERLEAVING d)

FILLING THE RECOURCE INCLUDIG AN INTERLEAVING e)

f)

20 SYMBOLE
$d_1$ $d_{17}$ .. $d_{305}$

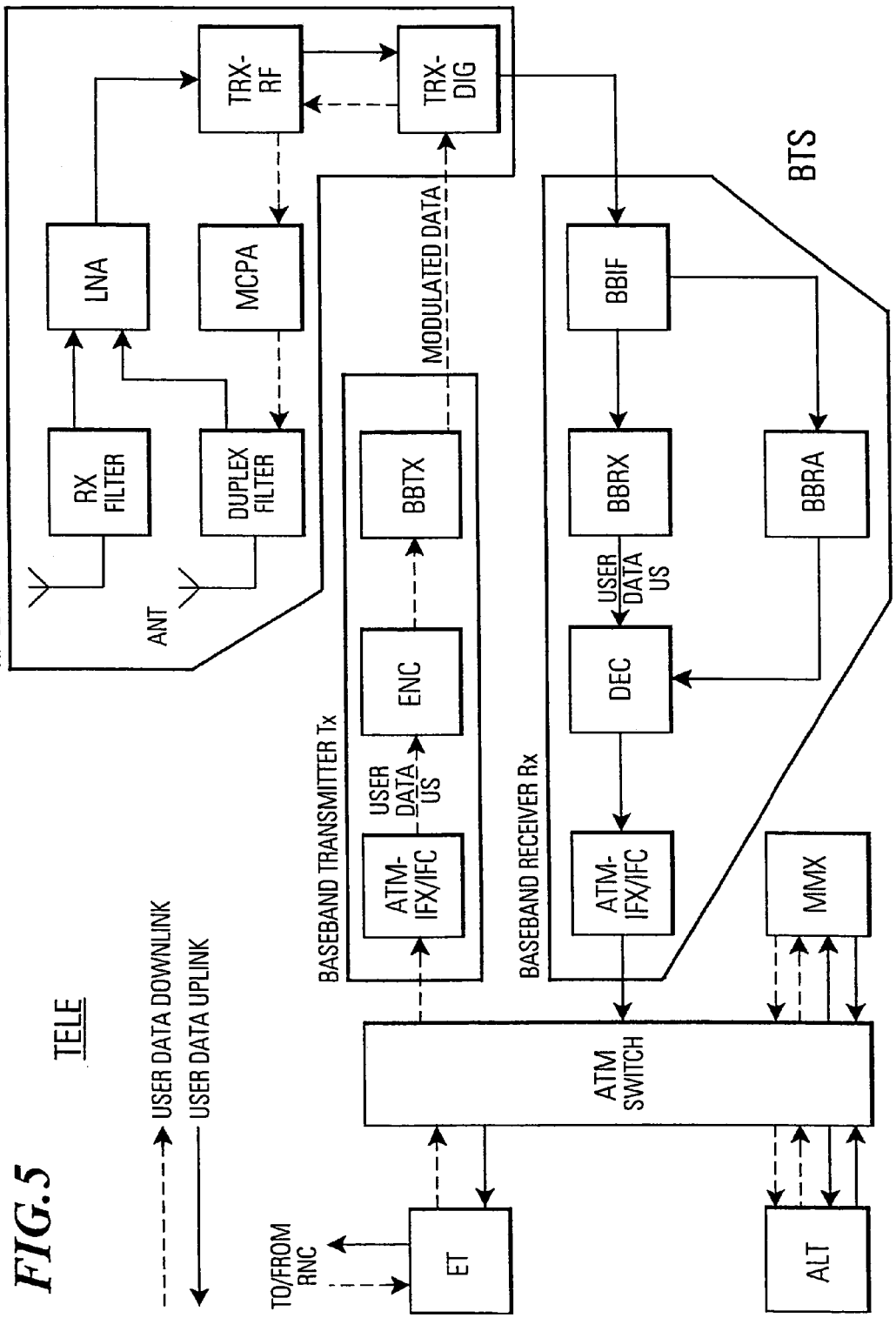
FIG.5  TELE

TIME-ALIGNMENT APPARATUS AND METHOD FOR PROVIDING DATA FRAMES OF A PLURALITY OF CHANNELS WITH PREDETERMINATED TIME-OFFSETS

This application is a continuation of U.S. patent application Ser. No. 09/667,529, filed on Sep. 22, 2000, now U.S. Pat. No. 6,781,976, claiming priority from EP application 99119008.3 filed on Sep. 28, 1999, the disclosures of which are incorporated herein by reference.

FIELD OF THE INVENTION

The invention relates to a time-alignment apparatus for providing data frames of a plurality of channels with predetermined time-offsets. The time-alignment apparatus is provided in a transmitter of a telecommunication system and receives successive data frames, each containing a predetermined number of data symbols, respectively from a number of channels and outputs the data symbols successively with predetermined time-offsets relative to a common synchronization clock. The invention also relates to a method for performing such a time-alignment, a transmitter of a telecommunication system and a telecommunication system, in which such a time-alignment is performed in a transmitter.

Typically, the time-alignment apparatus and the method are used in a telecommunication system based on a time division multiplexing or CDMA transmission. In such systems, the time-offset relative to a common synchronization signal indicates the beginning of the radio frames of the corresponding channels on the radio link (air interface or antenna). Before the transmission onto the radio link, the individual data frames must be stored and must then be provided with the time-offset. The invention particularly relates to the problem of how the different time-offsets between the data frames of a great number of user channels can be handled, in particular for a CDMA telecommunication system.

BACKGROUND OF THE INVENTION

In many telecommunication systems, the individual data frames of a number of channels are generated asynchronously, i.e. ATM data frames are not generated aligned to a given synchronization clock in the transmitter. If the individual channels have the same basic transmission rate $TR_B$ (on the air interface) the data frames will contain the same number of data symbols, however, they will still not be aligned to a common synchronization clock. The task of the transmitter is, despite the asynchronously arriving data packets from the individual channels, to transmit the data frames (or more precisely their data symbols) on the radio link with a predetermined respective time-offset per channel, which then characterizes the beginning of data frames of this particular user channel. The transmission to the receiver can introduce further time delays between the individual data frames, for example due to varying distances during the transmission, such that the receiver must perform a time-alignment with respect to a common synchronization clock provided in the receiver. The present invention relates to the time-offset adjustment in the transmitter.

An example of a mobile radio communication system, where such a time-offset adjustment is required, is a CDMA mobile radio communication system. FIG. 5 shows a block diagram of a base transceiver station BTS in such a CDMA communication system. FIG. 6 shows the encoder unit ENC of the base transmitter station BTS in FIG. 6. It should be noted that hereinafter the invention and their problems will be considered with respect to the CDMA system shown in FIG. 5, 6, however, the time-alignment is also applicable to any communication system requiring a time-offset adjustment.

In all telecommunication systems, where several channels each comprising successive data frames are provided, a separate encoder dedicated to a specific user channel must be provided in order to encode the successively arriving data frames of one particular channel. However, this would result in e.g. up to 300 encoder units, which is unacceptable in terms of the required hardware effort. For this reason, there is always the problem of how a common encoder resource can be used efficiently for encoding the data frames of all channels. In principle, this can be achieved if the time, which the encoder spends on encoding one data frame is much shorter than the duration of the data frame itself. Then, the encoder can process the data frames of several channels one after the other within one data frame period. Since the data frames of the individual channels do not arrive synchronized to a common synchronization clock and must be provided with a predetermined time-offset per channel to the air interface, the arriving data frames must be buffered in a memory, before a predetermined time-offset can be applied to them such that the data symbols can be delivered in form of a constant stream of data symbols to the modulation unit (e.g. the CDMA modulator BBTX in FIG. 6).

The invention particularly relates to the problem of how different time-offsets can be applied to the (possibly asynchronously) arriving data frames of a great number of channels.

SUMMARY

As described above, due to the fact that the time-offsets indicate the beginning of the individual radio frames of the corresponding channel on the radio link, the encoder unit must ensure that the individually (possibly asynchronously) arriving data frames from the user channels are available with a unique time-offset on the radio link. In addition to the problem that the data frames have to be provided with unique time-offsets, often an interleaving of data frame, more precisely of the data symbols contained therein, must be performed, i.e. the data symbols should be rearranged (interleaved) before the data symbols are provided as a data symbol stream to the modulator. The time-offset provision is to achieve minimum interference between the individual channels, i.e. it shall improve the correlation properties of a CDMA receiver. An additional interleaving improves the data reception at the receiver in fading channel environments which introduce burst errors in the received data frames.

Therefore, the object of the invention is to provide a time-alignment apparatus, a transmitter of a telecommunication system, in particular an encoder unit of a CDMA-system, a telecommunication system and a time-alignment method, which enable user data arriving in data frames from a plurality of user channels to have individually assigned unique time-offsets before transmission into the air, such that the interference between the code channels, for example the CDMA channels in a CDMA system, is minimized.

Another object of the invention is to provide a time-alignment apparatus, a transmitter of a telecommunication system, a telecommunication system and a time-alignment method, with which the encoder hardware can be used efficiently even for a large number of user channels.

This object is solved by a time-alignment apparatus of a transmitter of a telecommunication system for receiving successive data frames, each containing a predetermined number of data symbols, respectively from a number of channels, and for successively outputting the data symbols with a predetermined time-offset relative to a common synchronization clock, comprising:

a) at least a first, second and third read/write frame memory, each having a number of storage resources each for storing the data symbols of one data frame of a respective channel, said frame memories each having a write state in which data is written to said frame memories by an input means and a read state (in which data is read from said frame memories by an output means;

b) a control unit for cyclically switching said three frame memories through a first to third alignment mode synchronized to said common synchronization clock such that b1) in said first alignment mode said first and second frame memory are in a write state and said third frame memory is in a read state;

b2) in said second alignment mode said second and third frame memory are in a write state and said first frame memory is in a read state; and b3) in said third alignment mode said third and first frame memory are in a write state and said second frame memory is in a read state;

According to another aspect the apparatus comprises:

c) a write/read address providing means for providing a respective frame start write address (corresponding to said time-offset individually for each storage resource of a frame memory having a write state, and successive read addresses commonly for all storage resources of a frame memory having a read state;

d) wherein after each mode switching the input means starts writing the data symbols of a newly arriving data frame of every channel into the respective storage resource of a first write state frame memory which was in a read state in the previous mode at the respective frame start write address, and continues writing the data symbols into a corresponding storage resource of the other second frame memory having a write state at a write base address, if during the writing of the data symbols in said first frame memory the highest possible write address of the respective storage resource is reached; and e) wherein said output means successively reads one data symbol from the respective storage resources of said frame memory having a read state (at said successive read addresses.

Furthermore, the object is solved by a time-alignment apparatus of a transmitter of a telecommunication system for receiving successive data frames, each containing a predetermined number of data symbols, respectively from a number of channels, and for successively outputting the data symbols with a predetermined time-offset relative to a common synchronization clock, comprising:

a) at least a first, second and third read/write frame memory, each having a number of storage resources each for storing the data symbols of one data frame of a respective channel, said frame memories each having a write state in which data is written to said frame memories by an input means and a read state in which data is read from said frame memories by an output means;

b) a control unit for cyclically switching said three frame memories through a first to third alignment mode synchronized to said common synchronization clock such that b1) in said first alignment mode said first and second frame memory are in a read state and said third frame memory is in a write state;

b2) in said second alignment mode said second and third frame memory are in a read state and said first frame memory is in a write state; and b3) in said third alignment mode said third and first frame memory (are in a read state and said second frame memory is in a write states.

In another aspect the apparatus comprises:

c) a write/read address providing means for providing a respective frame start read address corresponding to said time-offset individually for each storage resource of a frame memory having a read state, and successive write addresses commonly for all storage resources of the frame memory having a write state;

d) wherein after each mode switching the input means successively writes the data symbols of a newly arriving data frame of every channel into the respective storage resource of the frame memory having a write state at said successive write addresses; and e) wherein said output means reads one data symbol from the respective storage resources of a first frame memory which was in a write state in the previous mode at the respective frame start read address, and continues reading the data symbols from a corresponding storage resource of the other second frame memory having a read state at a read base address, if during the reading of the data symbols in said first frame memory the highest possible read address of the respective storage resource is reached.

Furthermore this object is solved by a transmitter of a telecommunication system comprising a time-alignment apparatus as defined above.

The object is also solved by a telecommunication system comprising one or more transmitters as defined above.

Furthermore, the object is also solved by a method for time-aligning successive data frames each containing a predetermined number of data symbols number of channels, and for successively outputting the data symbols with a predetermined time-offset relative to a common synchronization clock, comprising the following steps:

a) writing data frames into at least a first, second and third read/write frame memory each having a number of storage resources each for storing the data symbols of one data frame of a respective channel, said frame memories each having a write state in which data is written to said frame memories by an input means and a read state in which data is read from said frame memories by an output means;

b) cyclically switching said three frame memories through a first to third alignment mode synchronized to said common synchronization clock wherein b1) in said first alignment mode said first and second frame memory are in a write state and said third frame memory is in a read state;

b2) in said second alignment mode said second and third frame memory are in a write state (WR) and said first frame memory is in a read state; and b3) in said third alignment mode said third and first frame memory are in a write state (WR) and said second frame memory is in a read state.

In another aspect the method also comprises the following steps:

c) providing a respective frame start write address corresponding to said time-offset selectively for each storage resource of a frame memory having a write state, and successive read addresses commonly for all storage resources of a frame memory having a read state;

d) writing, after each mode switching the data symbols of a newly arriving data frame of every channel into the respective storage resource of a first write state frame memory which was in a read state in the previous mode at the respective frame start write address, and continuing said writing of the data symbols into a corresponding storage resource of the other second frame memory having a write state a write base address, if during the writing of the data symbols in said first frame memory the highest possible write address of the respective storage resource is reached; and e) successively reading one data symbol from the respective storage resources of said frame memory having a read state at said successive read addresses.

Furthermore, the object is also solved by a method for time-aligning successive data frames; each containing a predetermined number of data symbols, respectively from a number of channels, and for successively outputting the data symbols with a predetermined time-offset and for successively outputting the data symbols with a predetermined time-offset relative to a common synchronization clock, comprising the following steps:

a) writing data frames into at least a first, second and third read/write frame memory, each having a number of storage resources each for storing the data symbols of one data frame of a respective channel, said frame memories each having a write state in which data is written to said frame memories by an input means and a read state in which data is read from said frame memories by an output means;

b) cyclically switching said three frame memories through a first to third alignment mode synchronized to said common synchronization clock such that b1) in said first alignment mode said first and second frame memory are in a read state and said third frame memory is in a write state;

b2) in said second alignment mode said second and third frame memory are in a read state and said first frame memory is in a write state; and b3) in said third alignment mode said third and first frame memory are in a read state and said second frame memory (RAM2) is in a write state;.

The method comprises, in another aspect of the invention, the following steps:

c) providing a respective frame start read address corresponding to said time-offset selectively for each storage resource of a frame memory having a read state, and successive write addresses commonly for all storage resources of the frame memory having a write state;

d) successively writing after each mode switching the data symbols of a newly arriving data frame of every channel into the respective storage resource of the frame memory having a write state at said successive write addresses; and e) reading one data symbol from the respective storage resources of a first frame memory which was in a write state in the previous mode at the respective frame start read address, and continuing the reading of the data symbols from a corresponding storage resource of the other second frame memory having a read state at a read base address, if during the reading of the data symbols in said first frame memory the highest possible read address of the respective storage resource is reached.

The object of the invention is also solved by claims 17, 18, 19, 20, 21, 22, 23, 24.

One advantage of the present invention is that (logically) three frame memories are used. Each frame memory can hold one complete data frame of all channels. During one period of an external common synchronization clock, two memories are used to write data frames and an one is used to read data. Of course, as a practical embodiment of the invention, either three single port RAMs (either used for reading or writing) or dual port RAMs (reading and writing at the same time) can be used. Thus, the three separate memories should only be logically seen as three separate memories, whereas one memory in terms of dual port RAMs can be used.

Another advantage is that the unique time-offset of the individual data frames may be (physically) realized by performing a writing process to two of the three RAMs being in a write state simultaneously during one frame cycle. Whilst writing to two RAMs having a write state the individual user data with its respective time-offset, occurring as a shift of the data symbols for one data frame over two RAMs, the reading from the third RAM is performed. When the next common synchronization clock pulse (frame synchronization pulse) occurs, the function of the three RAMs is cyclically changed. That is, the RAM used for reading will then be used as a RAM for writing and one of the two RAMs previously being used for the writing is now used for the reading of the data. The time-offset between the data frames of the individual channels relative to the synchronization clock can be adjusted to vary between 0 and a complete frame period. When the desired time-offset is 0, only the first RAM will have any data entries for this specific channel during one writing period. For time-offsets between 0 and one complete data frame, the data frame is written into two write RAMs. If the maximum of the time-offset is one frame, then the data is stored only in the second RAM. For time-offsets between 0 and one frame arriving packets containing data for one frame can overlap only two RAMs at the most.

Three RAMs and the cyclical change of the functions of the three RAMs thus enable that data frames having individually unique time-offsets (within the range of one frame) can be stored and transmitted with the desired time-offset relative to one common frame synchronization pulse. It is advantageous that after each cyclic change a newly arriving data frame of each channel is always written to the frame memory, which was in the read state in the previous mode. When the writing of the data frames is performed to the one or two write state frame memories, a write/read base address providing means provides a write base address corresponding to the time-offset. That is, if data frames arrive asynchronously at the encoder, the address providing means will issue the write base address at which the writing is to be started in the memory. Thus, the time-offset is realized by starting to write the data frames into the individual resources (=memory positions) of the frame memory at the given write base address.

A second aspect of the invention is to only use one frame memory for the writing and two frame memories for the reading. In this case, an arriving data frame is always written to the single write state memory at the lowest address and after the cyclic change performed with the occurrence of the next synchronization clock, the writing of data frames is continued in the next write state frame memory. In this case, the unique time-offset may be realized by issuing predetermined read base addresses which indicate at which memory position the reading is to be started in the first read state memory.

PREFERRED ASPECTS OF THE INVENTION

In the above described aspects of the invention, data frames of the plurality of user channels are respectively written into a storage resource of the respective memory. One possibility is that each storage resource is realized by one row of the frame memory, wherein the output means reads the data symbols successively along the column direction at the given read base addresses. In this case, no bit-interleaving is performed.

On the other hand, in many communication systems, on the transmitter side, a bit-interleaving is desired as explained above. In this case, according to a third aspect of the invention to achieve the interleaving, the writing into a respective storage resource also starts at the respective write base address, but the data symbols are not written simply sequentially in a row direction one after the other. The writing order is changed dependent on the desired interleaving technique (e.g. interleaving depth) such that during the reading process from the memory having the read state the data symbols are provided in the same order as if they had been written to an interleaving matrix (e.g. of a specific interleaving depth) and were read out in the column direction therefrom.

According to a fourth aspect of the invention, the data symbols of the data frames may be individual bits and may be stored separately at each memory location of the individual frame memories. However, if for example the data has undergone an I/Q selection process for digital QPSK modulation then data symbols built of two or more bits may arrive serially or parallel at the time-alignment apparatus. According to another aspect of the invention, if the data symbols consist of two or more bits, the individual bits of the data symbols are stored together in one memory location. Namely, the bits are not stored bit by bit (as in the conventional art) but in fact in data symbols comprising two or more data bits.

Further advantageous embodiments and improvements of the invention can be taken from the following description and the dependent claims. Hereinafter, the invention will be explained with reference to its embodiments and with reference to the attached drawings.

BRIEF DESCRIPTION OF THE DRAWINGS

In the drawings:

FIG. 1-2 shows data frames of a plurality of channels CH1 . . . CH8 input to the time-alignment apparatus shown in FIG. 1-1;

FIG. 1-3 illustrates how respective data packets belonging to respective data frames on a plurality of channels CH1 . . . CH8 are output with a time-offset by the time-alignment apparatus shown in FIG. 1-1;

FIG. 2-1 shows a basic structure of the time-alignment apparatus using three RAMs according to a first embodiment of the invention, where two frame memories are used for writing at predetermined base addresses and one frame memory is used for reading according to a first embodiment of the invention;

FIG. 2-2 shows the sequential switching between individual time-alignment modes M1, M2, M3 and the writing of new data frames into a frame memory, which was in a read-state in the previous mode in the first embodiment of the invention;

FIG. 2-3 show the case of using two read state memories and one write state memory according to a second embodiment of the invention;

FIG. 2-4a–c show several cases where more than 3 frame memories are required for performing the time-alignment of data frames;

FIG. 2-5 the column-wise reading of symbols in the alignment mode M3;

FIG. 3 shows an illustration for explaining the combined time-alignment/interleaving method according to a third embodiment of the invention;

FIG. 4-1 shows the reading and writing of a storage resource of the frame memory constituted by an interleaving matrix for performing a bit interleaving in the transmitter, wherein each data bit is stored at a separate memory location;

FIG. 4-2 shows the reading and writing of a storage resource constituted by an interleaving matrix for performing a data symbol-wise interleaving in the transmitter according to a fourth embodiment of the invention;

FIG. 5 shows an overview of a base transceiver station of a CDMA telecommunication system which the time-alignment method according to the invention can be applied.

In the drawings the same or similar reference numerals denote the same or similar parts or steps in all figures.

DETAILED DESCRIPTION

Hereinafter a CDMA base transceiver station BTS is explained to which the time-alignment apparatus and method of the invention can be applied. However, it should be noted that the description of the CDMA system only serves as application example for the present invention and that the invention can be applied to any other telecommunication system and transmitter in which data frames of a number of channels must be provided with a unique time-offset relative to a common synchronization clock signal. Therefore, the invention can be applied to any telecommunication system and transmitter, which implement a physical layer data processing in a time frame oriented manner.

Figures 2, 3, 4, 5:
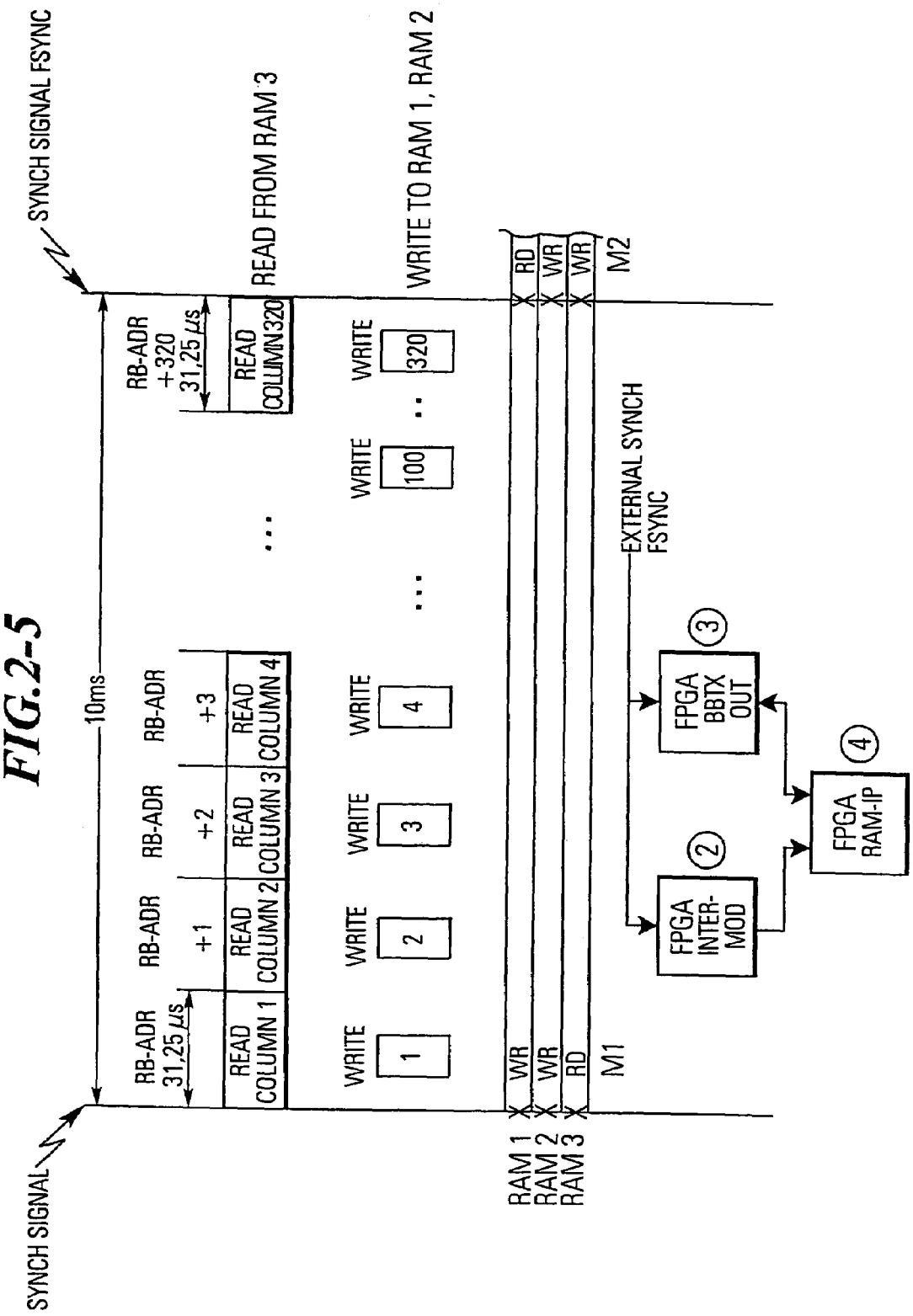
Figure 3:
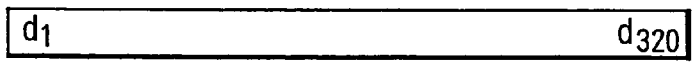
Figure 3:
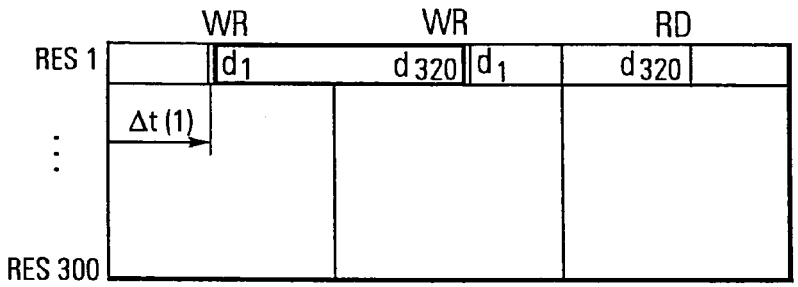
Figure 3:
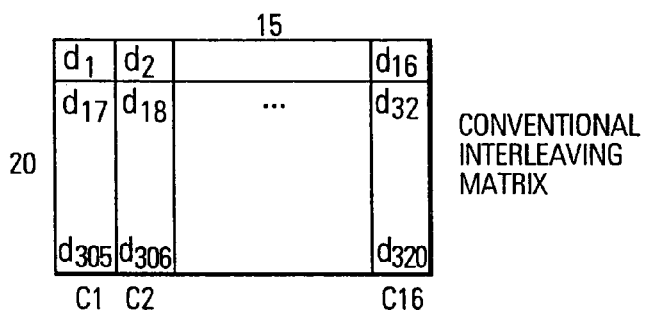
Figure 3:
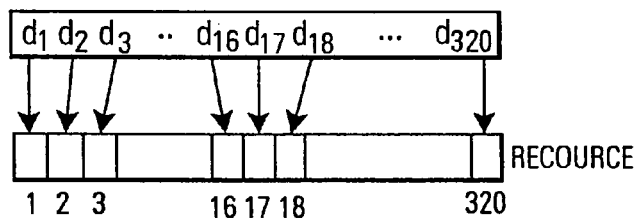
Figure 3:
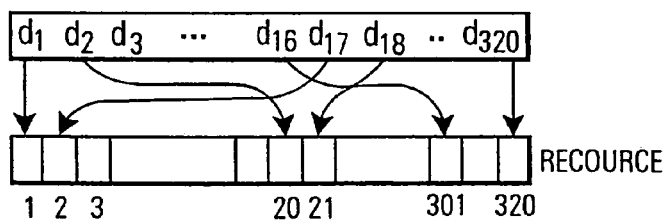
Figure 3:
Figures 2, 4:
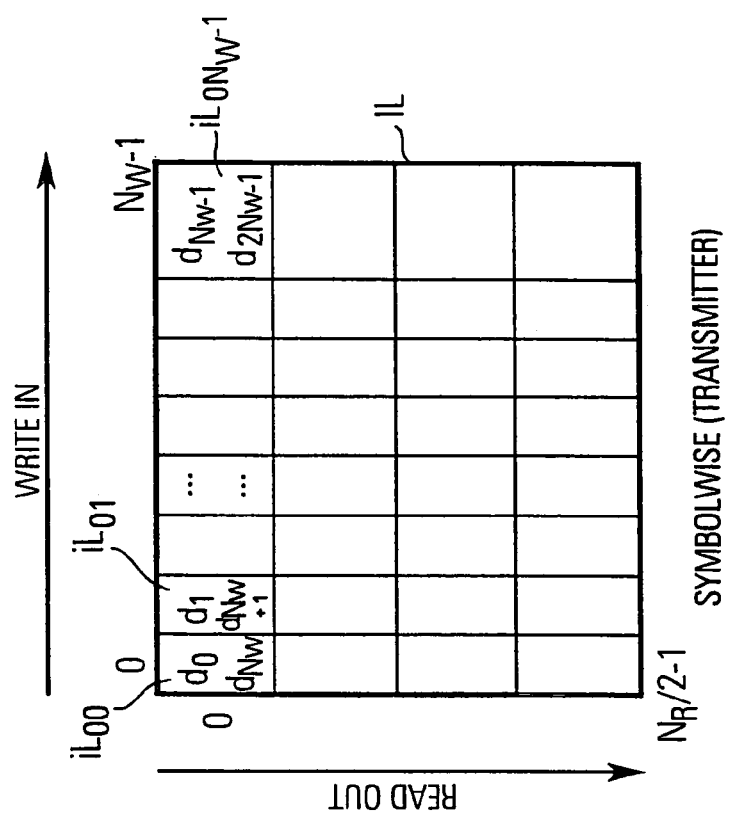
Figures 1, 4:
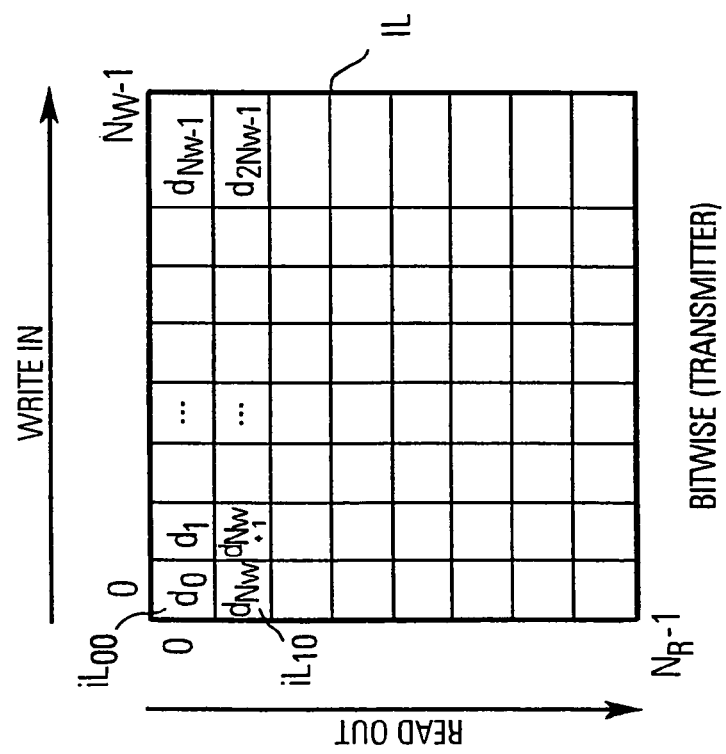

Briefly summarized, the block diagram in FIG. 5 shows a base transceiver station BTS of a CDMA-system comprising a baseband transmitter TX, a baseband receiver RX and a HF section. In the transmitter TX, user data, for example in the form of ATM packets, is input into a channel encoder unit ENC via an ATM switch and a corresponding interface ATM IFX/IFC. The coded (and also-interleaved data) is then modulated and CDMA spreaded by a baseband transmitter unit BBTX. The modulated data is then filtered and converted to an analogue signal in the unit TRX-DIG, upconverted to the desired carrier frequency in the unit TRX-RF, amplified by a power amplifier unit MCPA and finally transmitted to an antenna ANT via a duplex filter.

In the baseband receiver RX two antennas (diversity reception) are commonly used to receive the-signal which is then amplified in the unit LNA, downconverted in the unit TRX-RF, A/D converted and filtered in the unit TRX-DIG. Then the data is demodulated by a RAKE receiver/despreader in the receiver unit BBRX while random access channels are detected and demodulated in the unit BBRA. BBRX and BBRA see the same data and extract with a "code matched" filter within each unit the respective data which they need. The user data US are then decoded in the decoder unit DEC and transmitted to the ATM switch via an ATM interface ATM IFX/IFC.

In the CDMA base transceiver station BTS bit-interleaving and bit-de-interleaving is respectively performed in the encoder ENC in the baseband transmitter TX and the decoder DEC in the baseband receiver RX.

Figure 6:
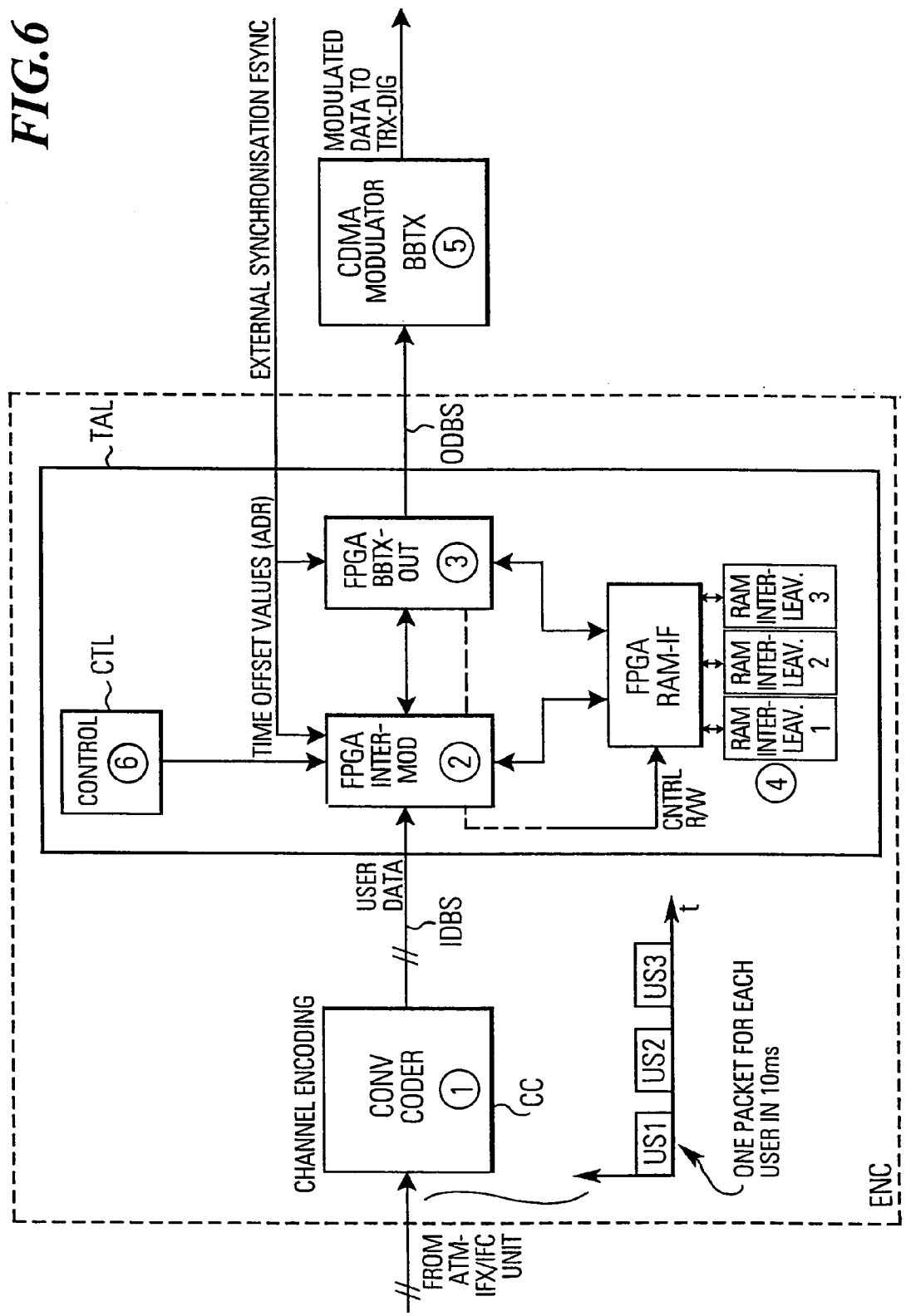
FIG. 6 shows an overview of the internal structure of the encoder unit ENC illustrated in FIG. 5.

FIG. 6 shows a functional overview of the encoder unit ENC according to the invention, where data of individual user channels US1, US2, US3 are input as sequential data frames including respective data bit sequences at ① into the convolutional coder CC. The interleaving is then performed in the free programmable gate array FPGA INTERMOD at ②. That is, in FIG. 6 a number of user channels (e.g. up to 300 different channels) input user data US and furthermore control information (not shown in FIG. 6) is supplied to the FPGA ②. The data is modulated, interleaved and time-aligned in the FPGA modulator FPGA INTERMOD at ② using the memory arrangement of three frame memories (RAMs) shown at reference numeral ④. The modulated, time-aligned and interleaved data is then transmitted to the CDMA modulation section BBTX at ⑤ of the transmitter by the FPGA BBTX-OUT at ③. The channel encoder CC can preferably be a convolutional coder, however, also other-codes may be used, e.g. block codes, turbo codes, etc. If the coder is a convolutional coder it makes use of a specific rate and constraint length as predefined by the encoder polynomial. For example, the CDMA transmitter in FIGS. 5, 6 uses a convolutional coder CC with a rate $r=\frac{1}{3}$ and a constraint length $c=9$.

Each data frame arriving from the ATM-IFX/IFC unit contains a data bit sequence of a predetermined number of data bits respectively belonging to the user channel. The individual code symbols of the input data bit sequence (IDBS) to Inter-Mod in each frame may consist of for example $N=2$ data bits for a QPSK modulation (i.e. an I-bit and a Q-bit).

In FIG. 6 a control unit CTL at ⑥ of the time alignment apparatus TAL provides time-offset values, e.g. addresses, to the FPGA INTERMOD shown with reference numeral ②. As schematically indicated in FIG. 6, other control signals CNTRL and read/write commands R/W are input directly from the units ② and ③ to the FPGA RAM-IF which acts as a data/address MUX for the RAM arrangement which is only needed for the write-in operation (1st embodiment). With the control information of the control unit CTL the individual data of the user data arriving from the convolutional coder CC is written to the three RAMs having applied to them a unique time-offset. Data frames, more precisely data symbols, are then read out and provided to the CDMA modulator BBTX. It should also be noted that the convolutional coder CC can be omitted such that the data of the data frames arriving from ATM-IFX/IFC are directly input to the time-alignment unit TAL at ②. Therefore, independent as to whether or not the input bits to the time alignment unit TAL are grouped into data symbols (I-,Q-bits) or not, for each channel there exists a successive stream of data frames which however do not arrive synchronized to the common synchronization clock. The output from the time alignment unit TAL to the CDMA modulator BBTX is a stream of consecutively arranged data bits or data symbols of the channels. Within one frame period of e.g. 10 ms respective data frames comprising a number of data symbols corresponding to the number of data symbols in a data frame input to the time alignment apparatus are provided to the modulator for each respective channel. However, since the time-alignment apparatus has applied a time offset to the input data frames, i.e. their data symbols, the respective data frames provided to the modulator contain time-shifted data symbols.

The input stream IDBS and the output stream ODBS will be explained with more detail below with reference to FIG. 1-2 and FIG. 1-3.

In such a CDMA system as shown in FIGS. 5, 6, physical channels or user data are thus transmitted with an individual constant time-offset relative to a common frame synchronization pulse, which is issued by the base transceiver station BTS. As mentioned above, in the CDMA method the time-offset indicates the beginning of radio frames of the corresponding channel on the radio link with respect to the frame synchronization pulse.

FIRST EMBODIMENT (TIME-ALIGNMENT PROCEDURE)

Figure 1:
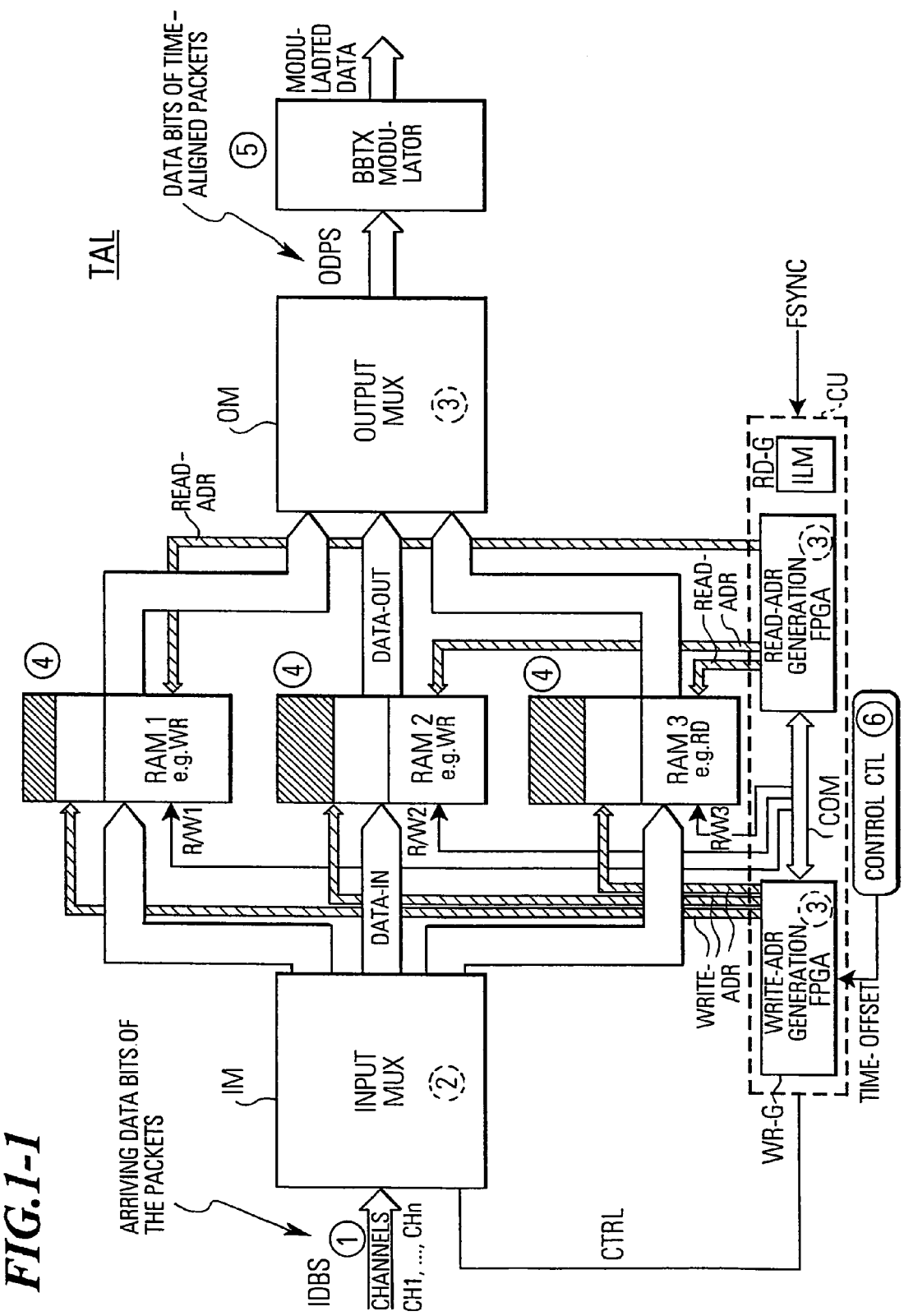
FIG. 1-1 shows a block diagram of a time-alignment apparatus of a transmitter TX according to the invention.

FIG. 1-1 shows a block diagram of a time-alignment apparatus TAL in a transmitter TX of a telecommunication system according to the invention. The time-alignment apparatus TAL corresponds to the time alignment apparatus TAL shown in FIG. 6 in the following manner. RAM 1, RAM 2 and RAM 3 in FIG. 1-1 correspond to the RAM structure shown with reference numeral ④ in FIG. 6. The input multiplexer IM and a unit WR-G in the control unit CU responsible for the provision of the addresses ADR used for writing to the RAMs correspond to the FPGA INTERMOD ② in FIG. 6. WR-G gets time-offsets for each user channel from the external control unit CTL. The output multiplexer OM and a unit RD-G in the control unit CU responsible for the provision of the addresses ADR used for reading correspond to the FPGA BBTX-OUT ③ in FIG. 6. The control unit CU in FIG. 1-1 is thus distributed over the components ②, ③ in FIG. 6, however functionally the circuits perform the same time-alignment procedure as explained below. A common synchronization phase FSYNC is applied externally to CU, more specifically to WR-G and RD-G (or to the corresponding units ②, ③ in FIG. 6).

Thus, in FIG. 1-1 the time-alignment unit TAL comprises an input means IM (i.e. the input multiplexer), an output means OM (i.e. the output multiplexer), and the three read/write frame memories RAM1, RAM2, RAM3 which can be set into a read or write state by means of the applied read/write signals R/W1, R/W2, R/W3. Instead of using three single port RAMs as shown in FIG. 1-1 (either used for writing or reading) there is also the possibility to use dual port RAMs (reading and writing at the same time). Therefore, the three different frame memories may also be visualized as being different portions of a single dual port RAM where a reading and writing may be performed simultaneously to different portions. For illustration purposes reference numerals ①, ④, ⑤ in FIG. 6 correspond to those shown in FIG. 1-1, whilst reference numerals ②, ③, ⑥ correspond to individual units formed by the input multiplexer IM, the output multiplexer and the control unit CU as explained above and are therefore not explicitly shown in FIG. 1-1.

In FIG. 1-1 the input multiplexer IM receives an input data bit stream IDBS consisting of successive data frames, each containing a predetermined number of data symbols, e.g. 320 symbols, respectively from a number of channels, e.g. 300. Although the invention is not limited to the case where each channel has the same fixed constant data rate, it is assumed in the present preferred embodiment that each user channel has a fixed and constant data rate such that the packets each contain the same number of symbols. On the other hand, a user may use several applications with different data rates. Then, the user channels can comprise one or more of the single channel resources each with its own specific but constant data rate.

Figures 1, 2, 3:
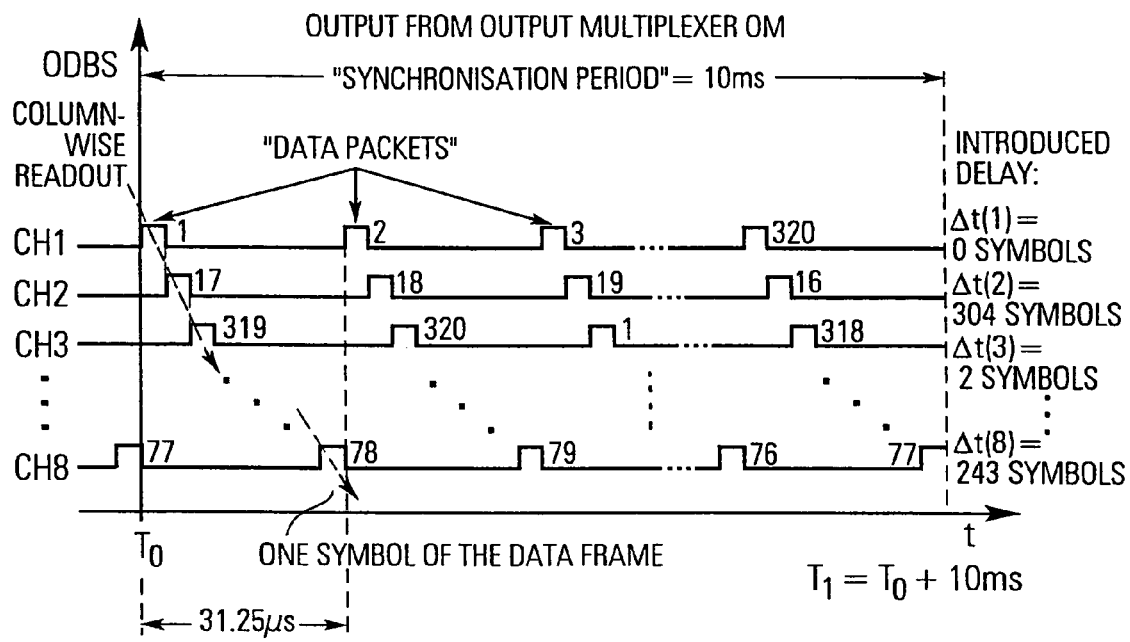
Figures 1, 2:
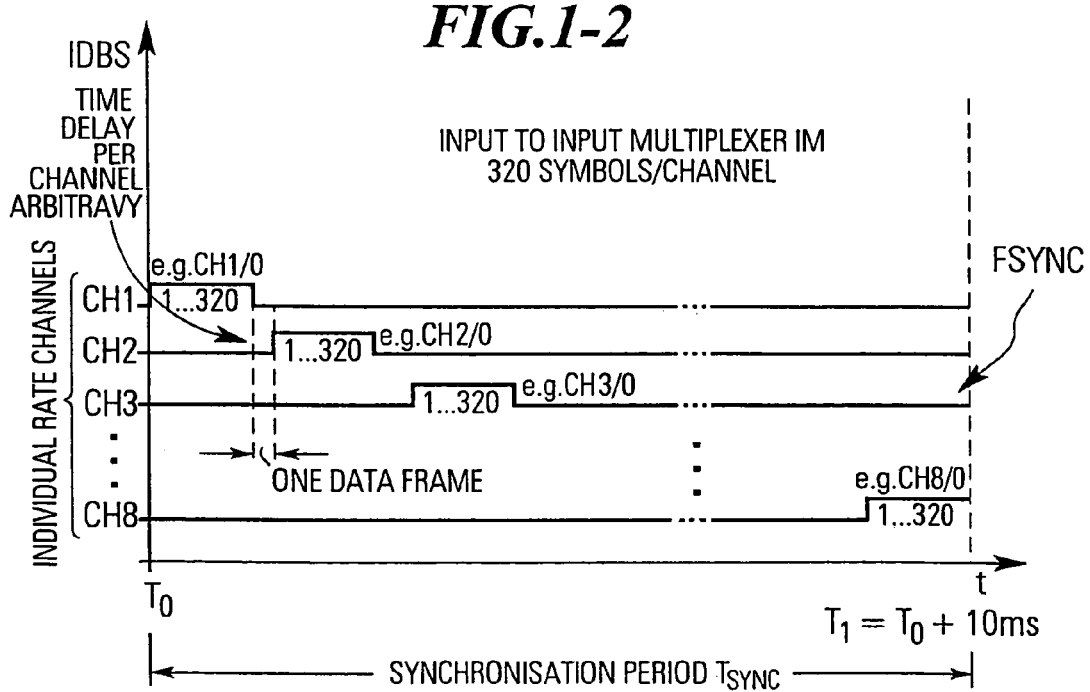
Figure 2:
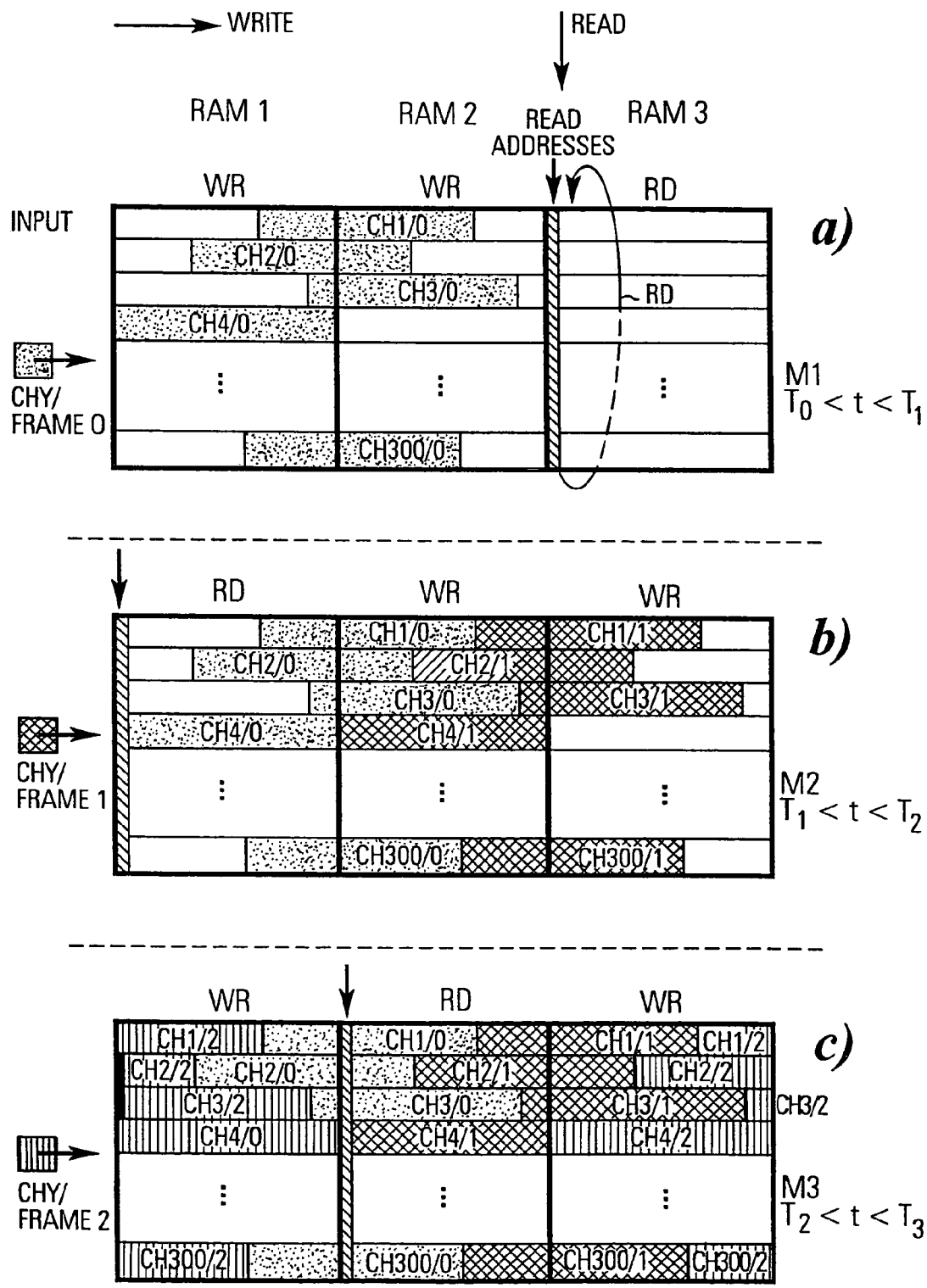
Figure 2:
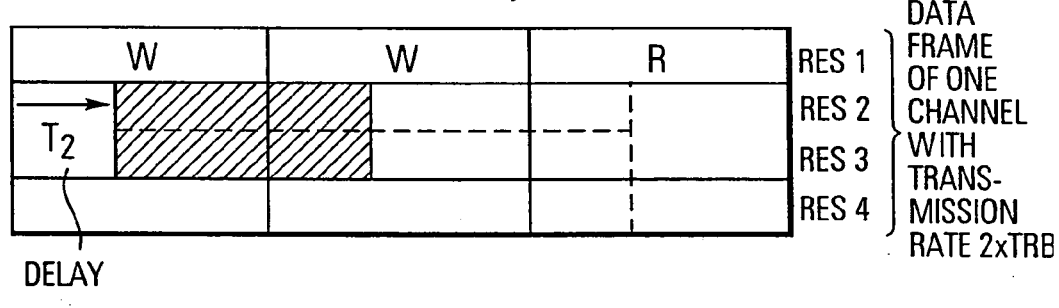
Figure 3:
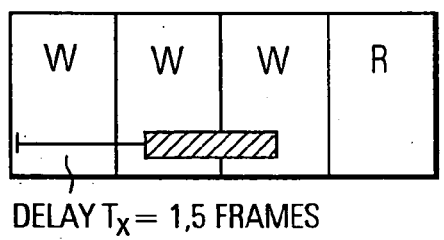

FIG. 1-2 shows an example of how the data of eight channels CH1, CH2, CH3 . . . CH8 arrive at ① within a frame period of e.g. 10 ms. The data symbols of a respective channel arrive in data frames CH1/0, CH2/0, CH3/0, . . . , CH8/0 each containing the same number of data symbols 1 . . . 320. Within one frame period of 10 ms one data frame of each channel arrives at the input multiplexer IM. As shown in FIG. 1-2, some unspecified time delay can exist between the individual data frames CH1/0, CH2/0, CH3/0 etc. depending on the asynchronous nature of the arrival of the data frames of the individual channels. Independent of the time delay, however, the only requirement is that one data frame of each channel arrives within one frame period of 10 ms. The input data bit stream (IDBS) or data symbol stream arrives serially at the input multiplexer IM. It may arrive also parallel if an additional buffer is present.

FIG. 1-3 shows the output data bit or output data symbol stream ODBS output by the output multiplexer OM. The output stream ODBS comprises successive data symbols with a predetermined time-offset relative to the common synchronization clock $T_0$, $T_1$. In particular, FIG. 1-2 shows an example how the data of eight channels CH1 . . . CH8 are output at ③ within a frame period of 10 ms. The data of a respective channel is output in e.g. 320 data packets (each comprising one symbol). However, the data packets of the eight channels are output in a time-sharing manner, i.e. time multiplexed, or in parallel. Each data packet comprises one data bit or data symbol. One data symbol can for example consist of N=2 data bits. Therefore, in this case the output bus from the output multiplexer to the modulator BBTX comprises two lines for all data packets of the eight channels. If the transmission rate is 256 ksps (=8 symbols/31,25 μs)on the bus, then further sets of channels CH9 . . . CH16 or CH17 . . . CH24 (not shown in FIG. 1-2) etc. will require further buses each with two lines. On the other hand, assuming a transmission rate of 16.38 MHz on the bus, in total 31.25 μs*16.38 Msps=512 channels can be time-multiplexed. That is, the number of channels is only limited by the transmission rate on the bus.

Whilst in the invention it is irrelevant whether the respective data packets are output for the channels in a time sharing manner or in parallel it is important to note that for each channel a number of data symbols corresponding to the number of data symbols in the data frame input to the time-alignment apparatus are output in a single frame period of e.g. 10 ms (however of course not the same data symbols since a time-offset is applied in the time-alignment apparatus).

As is shown in FIG. 1-3, the 320 data symbols from the individual data frames have respective time-offsets ΔT(1), ΔT(2), ΔT(3), . . . , ΔT(n), . . . ΔT(8) with respect to the common synchronization clock. For example, the first data symbol 1 of the first channel CH1 has no time-offset, since it starts exactly with the occurrence of the synchronization clock. Obviously, since the first data packet of channel CH2 contains the data symbol 17, the data symbols of the second channel CH2 have a time delay ΔT(2)=304 symbols. The third channel CH3 has a time-offset of ΔT(3)=2 data symbols since the first symbol is the data symbol 319. As a further example, the channel CH8 has a time-offset ΔT(8)= 243 data symbols. Since after outputting one data symbol from the channel CH8 the output is continued with a next data symbol 2 from channel CH1, it must be ensured that the output frequency by the output multiplexer OM is high enough that all 320 symbols of one data frame of all channels are output within a period of 10 ms. This means that within a period of 10 ms/320=31.25 μs one data symbol of each channel must be output. Since the output means OM steps through from the first to eighth channel CH1 . . . CH8 to read one data symbol within the period of 31.25 μs, but different data symbols, i.e. the 1-st, the 17-th, the 319-th . . . the 78-th data symbol is read, the time-alignment apparatus of the invention successively outputs the data symbols with a predetermined time-offset relative to the common synchronization clock. It is clear that it is irrelevant whether the output data bit stream is output parallel or serially as long as the different data symbols are read from the frame memories by the output means-OM-in the current sequence.

In order to convert the input stream IDBS of FIG. 1-2 to an output stream ODBS as shown in FIG. 1-3 the input means IM and the output means OM write and read data to three frame memories shown at ④ in FIG. 1-1.

FIG. 2-1 shows the principle of using the three frame memories RAM1, RAM2, RAM3 for a snap shot in time where the first memory RAM1 has a write state WR, the second memory RAM2 also has a write state WR and the third frame memory RAM3 has a read state RD (hereinafter called a first alignment mode M1). As an example, FIG. 2-1 shows the respective data frames ch1/0, ch2/0, ch3/0, . . . , ch8/0 of the individual channels shown in FIG. 1-2 (in the denotation chy/x, x denotes the x-th data frame and y denotes the number of the channel). The first, second and third read/write frame memory RAM1, RAM2, RAM3 have a number of storage resources RES1, RES2, RES3, RES4 . . . RES300 which can hold all the data symbols of one single data frame of a respective channel. For example, the data frame ch4/0 of the channel ch4 fully fits into the storage resource RES4 of the first frame memory RAM1. In the simplest case, when no interleaving is to be performed, the storage resources can be viewed as individual rows of the frame memories. In the illustrated case the frame memories have $N_{res}max=300$ rows and $N_{symbol}=320$ ($N_{symbol}=$number of data symbols or data bits per data frame) columns. Writing of data of the data frames is then performed in the row direction and a reading of a frame memory having a read state as RAM3 is performed in the column direction as indicated with the arrows in FIG. 2-1.

Figure 4:
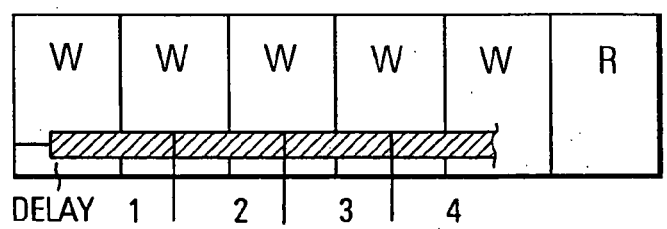

As explained below with more details, according to another embodiment of the invention the time-alignment is combined with the interleaving of the data symbols or data bits of the individual data frames in which case the individual resources will still be written to in the row direction, however a special writing order will be used such that during the reading out in the column direction the data symbols will be read out in a sequence which is the same sequence that would be generated if the symbols would be written and read in a conventional manner from a conventional interleaving matrix (as schematically shown in FIGS. 3, 4). This specific writing order will be explained below with more detail with reference to FIG. 3. Hereinafter, first the writing and reading of the data symbols will be explained without the interleaving process.

In FIG. 2-1 each frame memory has a write-base address WB-ADR which indicates the first memory position into which a data symbol of a data frame not obtaining any time-offset has to be written. When the storage resources are formed by the individual rows, in fact the write-base address WB-ADR is the first column position. Each frame memory also contains an end address or a highest possible address END-ADR where for example the last data symbol of a data frame not obtaining any time-offset is to be written. Since in the third frame memory RAM3 a reading process is performed, read addresses beginning with the read-base address RB-ADR are applied to the third frame memory RAM3. The reading of one column, i.e. one data symbol from each storage resource, is sequentially performed within the time period of e.g. 31.25 μs as shown in FIG. 1-3.

A main aspect of the time-alignment procedure is the provision of frame start write addresses FRST-ADR$_{ch1}$ . . . FRST-ADR$_{ch300}$ (generally a frame start write address FRST-ADR$_{chy}$ for the respective channel chy as shown in FIG. 2-1). A general formula for calculating the frame start write address FRST-ADR$_{chy}$ is: FRST-ADR$_{chy}$=WB-ADDR+time-offset$_{chy}$ (converted into numbers of symbols for the respective channel chy).

That is, despite the fact that the data packets ch1/0, ch2/0, ch3/0 . . . ch300/0 of the input stream IDBS arrive with no predetermined time-offset, the writing of the data symbols or data bits of the individual data frames starts at a predetermined frame start-address FRST-ADR$_{chy}$ provided uniquely and independently for each channel by the control unit CU via the address lines WRITE-ADR in FIG. 1-1 (corresponding to the time-offset given by the control unit CTL). Thus, the unique time-alignment offset is provided by shifting the data frames from the write-base address WB-ADR to the frame start write address FRST-ADR$_{chy}$. Each starting point of the data frame is thus identified by a frame start write address. As is seen in FIG. 2-1, the individual data frames thus have individual time alignment offsets ch.1, ch.2, ch.3, . . . ch.300. The write address providing means WR-G of the control unit CU in FIG. 1-1 (or the FPGA (Z in FIG. 6, respectively) provides the respective frame start write addresses corresponding to the time-offset individually for each storage resource and successive read addresses commonly for all storage resources.

As shown in FIG. 2-1, only the channel ch4 has no time-offset (time-offset=0) such that it completely fits into the RAM1. Thus, the frame start write address FRST-ADR$_{ch4}$ is identical with the write-base address WB-ADR. Since the size of each RAM storage resource or a single channel is such that it can only hold the data of one complete data frame of the specific channel, two frame memories RAM1, RAM2 are needed for providing the time alignment function for time-offsets different to 0 and up to the maximum for the time-offset of one frame. That is, if for example the data of the data frame ch1/0 of the channel ch1 is started in the last third of the storage resource RES$_1$ of the RAM1, then the data is consecutively written into the row direction until the highest possible write address, i.e. the write end address END-ADR is encountered. Then the writing of data symbols is continued at the write base address of the second frame memory RAM2 which also has a write state WR until the complete data frame is stored in the two RAMs in an overlapping manner.

The frame start address for a single channel is generated from the write-base address plus the individual time-alignment offset (in terms of the number of symbols) for this channel. That is, the writing always starts at the frame start write address and the individual channel data is thus aligned with a specific time-offset (=address offset) from the write-base address. Data is written one channel after the other due to their serial arrival in the form of data packets. Once all symbols of e.g. the data frame ch1/0 has been written to the RAM1, RAM2, the data symbols for the next succeeding data frame ch1/1 of the same channel are written to the second RAM2 starting again from the frame start write address provided for channel ch1. In-between the writing of data frame ch 1/0 and data frame 1/1 all other data frames chy/0 are written into the memory using their respective frame start write address. As will be explained with respect to the cyclic mode switching during the alignment, for the next arriving data frame ch1/1 the RAM1 has changed its write state WR to read state RD whilst the third RAM3 has changed its read state RD to a write state WR, such that the next channel ch1/1 is written in an overlapped manner into the second and third RAM2, RAM3. This will be explained with more detail with reference to the description of the method of the invention as shown in FIG. 2-2.

It should be noted that the provision of a frame start write address corresponding to the desired time-offset is also applicable to the case where additionally an interleaving is performed as will be explained with more detail below in FIG. 3. The first symbol corresponding to the symbol which would be written to a row/column position 0,0 in an interleaving matrix is written to the column address indicated by the frame start write address. The second and succeeding symbols are written in a specific order as will be explained below with reference to FIG. 3.

Whilst in the two RAM1, RAM2 the writing is respectively started from the frame start write address determined with respect to the write base address, the reading in the third RAM3 starts from the read-base address. That is, the data is then read in the column direction, i.e. one symbol of each channel is read one after the other, starting at the read-base address instead of reading all data of one channel before proceeding to the next channel. The light grey block in FIG. 2-1 moving from the left to the right indicates this reading operation. All this happens within the period of the common frame synchronization pulse. That is, as mentioned above, within one sub-period of 31.25 μs one data symbol of each resource is read in the column direction such that all data symbols of all data frames can be output by the output means OM within the common synchronization period of 10 ms. FIG. 2-5 shows this column-wise reading ("Read column") when reading from RAM3 and writing to RAM1 and RAM2 (called the first "alignment mode" in FIG. 2-2a)

In one synchronization period $T_0<t<T_1$ of 10 ms the alignment mode M1 is maintained, i.e. the three frame memories RAM1, RAM2, RAM3 keep their respective write/read states WR, WR, RD. Thus, independent as to whether no time-offset is predetermined (like channel ch4) such that the data frame fits into one frame memory only, or whether the data frame is written in an overlapping manner in two frame memories, there is sufficient time to write the data symbols of all data frames to the respective storage resources within the synchronization period as shown in FIG. 1-2. Therefore, it is not necessary that a data frame, e.g. ch4/0, arrives at the input multiplexer IM synchronized to the start of the synchronization period $T_0$. The only requirement is that a cyclic write/read data change is performed in respective alignment modes as will be explained hereinafter with reference to FIG. 2-2.

To perform the cyclic switching of the three frame memories through a first to third alignment mode M1, M2, M3 synchronized to the common synchronization clock, the control unit CU in FIG. 1-1 (or respectively the FPGA units ②, ③ in FIG. 6) applies respective write/read control signals R/W1, R/W2, R/W3 to the respective frame memories RAM1, RAM, RAM3. As also shown in FIG. 1-1, the write/read address providing means WR-G, RD-G provides the respective address signals WRITE-ADR, READ-ADR to the frame memories, in particular the frame start write addresses FRST-ADR$_{chy}$ (in FIG. 6 the FPGA ② applies these addresses to the RAM unit ④) and the respective sequential read addresses (in FIG. 6 the FPGA ③ applies these addresses to the RAM unit ④). The frame memories each have a write state WR, in which data can be written to the frame memories, and a read state RD, in which data can be read from frame memories. Via a common connection COM shown in FIG. 1-1 the units WR-G and RD-G communicate so that no collisions of read and write operations occur at the respective RAMs.

The input multiplexer IM selects data from the data frames at the input ① and provides them to the frame memories RAM1 . . . RAM3 in response to the CTRL signal provided by the control unit CU. The control unit CU (respectively the FPGA ② in FIG. 6 itself) then specifies the addresses ADR (beginning with the frame start write address) where the data is to be stored in the frame memories. Thus, for each channel, the input means IM successively provides the data of the data frames and the control unit CU (i.e. the units WR-G, RD-G) controls the write/read state of the three frame memories such that data frames are always written into two frame memories in a write state and data is -read synchronized to the common synchronization clock from one frame memory having, a read state. For example, if in FIG. 1-1 the frame memory RAM3 has a read state RD, data frames can only be read out from RAM3 and data is only written to the first and second frame memories RAM1, RAM2 having a write state.

With the occurrence of the externally applied synchronization clock pulse FSYNC (meaning frame synchronization pulse) in intervals of e.g. 10 ms (see FIG. 1-2) the memories cyclically change their read/write state due to the application of respective read/write control signals R/W1, R/W2, R/W3 and the output multiplexer OM starts to read from the memory having a read state at the indicated read base address. Since in the illustration in FIG. 1-1 the control unit CU is assumed to be responsible for switching the read/write state and for applying the respective read/write addresses the synchronization pulse FSYNC is applied to CU such that it knows when to switch the read/write states. Although it is only shown in FIG. 1-1 that the synchronization pulse fsync is applied to the control unit CU, it should be understood that each unit WR-G, RD-G, IM, OM receives the synchronization pulse FSYNC; that is, in FIG. 6 all FPGAs shown there receive the synchronization pulse whilst the control unit CTL does not need to receive this pulse. Within each common synchronization clock period all data symbols of all data frames stored in one frame memory in a read state are read out.

Furthermore, the control unit CU (in FIG. 6 the FPGA ②) implements an interleaving of the data symbols of each data frame when the storage resources are constituted by interleaving matrices. Then the writing order to the interleaving matrix is different. This interleaving process is carried out by an interleaving means ILM shown to be part of the control unit CU in FIG. 1-1 or in FIG. 6 by the FPGA ②. This will be described below with further details in the third embodiment with reference to FIG. 3.

It should be noted that FIG. 1-1 only shows a possible configuration of how the writing of data frames to the three frame memories and the reading out of data frames from the three frame memories can be performed. As explained above, it should be understood that other configurations of the input means IM, the output means OM and the control unit CU are possible, for example in connection with a dual port RAM. The important aspect of the present invention resides in how the individual memories are used regarding their read state and write state with respect to the common synchronization clock and the provided frame start write addresses.

FIG. 2-2a, FIG. 2-2b and FIG. 2-2c show the entries of the three frame memories RAM1, RAM2, RAM3, respectively, for the channels ch1, ch2, ch3, ch4 . . . ch300 for three synchronization clock periods $T_0<t<T_1$, $T_1<t<T_2$ and $T_2<t<T_3$. The first, second and third frame memories RAM1, RAM2, RAM3 respectively store data frames of the channels CH1, CH2, CH3, CH4 . . . CH300 and the frame memories each have a write state WR in which data can be written to and a read state RD in which data frames can be read from the frame memory, wherein the current state WR/RD is marked in FIG. 2-2a, b and c.

For all periods in between the occurrences of the common synchronization clock, a so-called alignment mode is indicated in FIGS. 2-2a, b, c. Three alignment modes can be distinguished, namely:

mode "M1": 1WR, 2WR, 3RD: the first memory is in the write-state WR, the second frame memory is also in write-state WR and the third memory is in a read state RD;

mode "IM2": 1RD, 2WR, 3WR: the second frame memory is in a write state WR, the third frame memory is also in a write state WR and the first memory is in a read state RD; and mode "M3": 1WR, 2RD, 3WR: the third memory is in a write state WR, the first memory is also in a write state WR and the second memory is in a read state RD.

The alignment modes M1–M3 are maintained during the respective synchronization clock periods from $T_0$ to time $T_1$, $T_1$ to $T_2$ and $T_2$ to $T_3$, respectively. After the time instant $T_3$, the alignment modes are repeated in the same order. Thus, FIG. 2-2 shows the cyclic switching through three kinds of alignment modes M1, M2, M3. With the occurrence of each common synchronization clock, a predetermined read/write state of the three frame memories is switched by the control means CU shown in FIG. 1-1 (or by the FPGA unit ③ in FIG. 6, respectively).

As is shown in FIG. 2-2, there are always two frame memories in a write state WR, e.g. in FIG. 2-2a the first memory RAM1 and the second memory RAM2 constitute a first and second write state memory, respectively. After the mode switching to mode M2 the second memory RAM2 keeps its right state WR and constitutes the first write state memory in the second alignment mode M2, whereas the third memory RAM3 will constitute the second write state memory in this alignment mode M2. In the third alignment mode M3 the first write state memory is formed by the third memory RAM3 and the second write state memory is formed by the first RAM1. Thus, with each mode switching the second write state memory keeps its right state and constitutes the first write state memory in the next mode. This is important, since the writing of a newly arriving data frame, e.g. ch1/1 in FIG. 2-2b is always started at the respective frame start write address in the frame memory which constitutes the first write state memory in the respective alignment mode.

Hereinafter, the time-alignment method of the invention will be described with reference to FIG. 2-2 with more detail. As shown in FIG. 2-2a, in the synchronization period $T_0<t<T_1$ and in the alignment mode M1, the respective first data frame ch1/0, ch2/0, ch3/0, ch4/0 . . . ch300/0 is written to the first and second write state memories RAM1, RAM2 starting at their respective frame start write addresses as explained with reference to FIG. 2-1. If each storage resource is formed by a row in the memory, then a row-wise writing of the data frame is performed. At the same time, in the alignment mode M1 in FIG. 2-2a, the reading out of data symbols is performed in the third frame memory RAM3.

The write/read address means WR-G/RD-G in FIG. 1-1 (or respectively the FGPA unit ③ in FIG. 6) successively supplies read addresses for reading out one data symbol of each data frame in the column direction. After finishing the reading out of one column, the next read address is applied and the reading is again performed columnwise starting with one-data symbol stored at the read address in the first storage resource, as indicated with the arrow rd. Thus, during the writing-of data of all data frames to the two write state memories RAM1, RAM2, all data symbols of all channels are read out from the third memory RAM3.

As shown in FIG. 2-2b, after the mode switching to mode M2, the second frame memory RAM2 keeps its write state WR and constitutes the first write state memory into which a respective succeeding data frame ch1/1, ch2/1, ch3/1, ch4/1 . . . ch300/1 is written, again starting with the predetermined frame start write address (not indicated in FIG. 2-2). As indicated on the left side in FIG. 2-2b, in the alignment mode M2 the second frame of all channels chy/frame 1 is written to one or two write state memories RAM2, RAM3.

In FIG. 2-2c, in the alignment mode M3, the third frame chy/frame 2 of all channels chy is written to the two write state memories RAM3, RAM1 beginning in the first write state memory RAM3 at the respective frame start write addresses. As can be best seen in FIG. 2-2c for the read state memory RAM2, if the reading out is performed columnwise with respect to the sequentially given read addresses, respectively one data symbol from each data frame is read out. During the reading out in the alignment mode M3, i.e. the first reading of a column from the readstate memory RAM2, for example the first data symbol 1 from the data frame ch4/0 is read, a 17-th data symbol may be read out from the data frame ch2/0, a 319-th data symbol may be read out from the data frame ch3/0 and a 78-th data symbol may be read out from the data frame ch300/0 etc. The number of the data symbol which is read out is obviously determined by the address shifting with respect to the write base address, i.e. due to the frame start write address. Thus, the modulator BBTX is provided with an output data bit or data symbol stream ODBS containing sequences of respectively one data symbol of each channel, however, the data symbols are shifted. Thus, viewed over one complete synchronization clock period, a data frame consisting of consecutively read out data packets per channel (see FIG. 1-3) is provided to the modulator BBTX.

As explained above, in each alignment mode MX (X=1, 2,3) there are always a first and second write state memory whereas the second write state memory keeps its a write state after a mode switching and thus forms the first write state memory in the next alignment mode. A newly arriving data frame is always written beginning in the first write state memory at the frame start write address. FIG. 2-5 shows the switching of the alignment M1 to the alignment mode M2 synchronized to the common synchronization clock pulse FSYNC.

The above described embodiment relates to a case where the N channels have the same basic transmission rate $T_{RB}$ (e.g. 32 ksps) and a maximum time-offset of one frame only. Furthermore, each channel contains one packet in every synchronization period of e.g. 10 ms. In such a case three RAMs 1,2,3 in FIG. 2-2 are sufficient. However, the basic idea of the invention can be expanded to cases involving a) higher transmission rates and/or b) :a time-offset larger than one frame and/or c) channels which contain a single packet only every integer multiple of the synchronization period.

Such expansions are performed as schematically shown in FIG. 2-4a, FIG. 2-4b and FIG. 2-4c.

As shown in FIG. 2-4a, for the case a) of using a higher transmission rate of $2*T_{RB}$ (=64 ksps) in one or more channels, two resources RES2, RES3 must be combined to store all symbols of a single data packet.

As shown in FIG. 2-4b, for the case b) of using an expanded range for the time-offset of e.g. $T_X$=1.5 frames, 3 write RAM sections and one read RAM is used since with only three RAMs, the maximum time-offset can only be one data frame. Thus, by using more than three RAMs a higher time-offset of two, three etc. data frames can be achieved. Still one RAM is used for the reading, whilst all others are used for writing.

As shown in FIG. 2-4c, for the case c) where a channel sends one packet e.g. only every 40 ms to the BTS, the data symbols have to be distributed over more frames during one write access. For example, a total number of 6 RAMs is used when there is a need for spreading one incoming data frame over 4 frames after convolutional encoding for some of the channels. Also combinations of the cases a), b), c) are possible.

It should be noted that the time-alignment using three RAMs according to the invention has a close relationship to the CDMA-system, since here the individual user channels are supposed-to have individual time-offsets in order to minimize the interference between the channels. However, the invention is independent as to whether the encoder unit is realized by a digital signal processor DSP or a FPGA solution as in FIG. 6.

SECOND EMBODIMENT (2 RD MEMORIES/1 WR MEMORY)

It should be noted that the principle of the invention as explained with reference to FIGS. 2-1, 2-2 and FIG. 1-2, FIG. 1-3 can also be realized by using a structure of three frame memories where two frame memories always keep read state RD and only one memory keeps a write state WR. Again the function of each RAM is changed cyclically with the characteristic that then two RAMs are for reading and only one for writing. That is, during one common synchronization clock period all data frames will be stored into the write state memory. Of course, since only one memory keeps a write state, there cannot be an overlapping writing of one data frame into two memories.

The time-offset adjustment is then achieved by providing respective frame start read addresses (FRST-ADR$_{chy}$ in FIG. 2-3 now designates the respective frame start read addresses) individually for the resources in the two other frame memories. In FIG. 2-3 the start address for reading which is different for every channel is the address at the beginning of the hatched regions. The hatched regions themselves indicate the respective writing processes. As before, the read memories are read principally in the column direction and e.g. every 31.25 μs the reading is changed to the next column. That is, for example a frame start read address for the first channel ch1 might start reading a data symbol of a data frame in the center of the resource, a frame start read address for the channel ch1 might start only in the last third of the read memory etc. Thus, the time-offset adjustment is not achieved by providing individual frame start write addresses when writing the data frames to the memory, but providing individual frame start read addresses to the individual resources (i.e. in the respective rows). The reading will still be performed such that data symbols of the respective data frames are read out one after the other substantially in the column direction, however, since the frame start read address will be different in each resource, there will be a zigzag type reading of the resources. After reading a symbol from the resource (row) of the highest channel the reading is continued at the next data symbol at the respective frame start reading addresses plus 1. FIG. 2-3 shows this type of reading and writing in the case of two read memories and one write memory similarly as in FIG. 2-2.

If the data of one data frame does not fit into one data frame or if a larger time-offset is desired as discussed above for the cases in FIGS. 2-4c, 2-4b in the first embodiment, also more than three frame memories can be used in the second embodiment similarly as in the first embodiment. If a data packet extends over more than one frame 4 write memories and 2 read memories are used. If the time-offset is larger than 1 frame then 1 write memory and three read memories are used.

THIRD EMBODIMENT (TIME-ALIGNMENT/INTERLEAVING)

In the above described first and second embodiment it was assumed that each data frame contains a plurality of data bits or data symbols and that these data symbols are written into a storage resource formed by a respective row of a frame memory as shown in FIGS. 2-1, 2-2, 2-3, 2-4. In this case one can speak of a row-wise writing and a column-wise reading in accordance with the frame start write addresses and the read-addresses or the write addresses and the frame start read addresses. Hereinafter, a third embodiment will be described with reference to FIG. 3 which illustrates the combined interleaving/time-alignment according to the invention.

FIG. 3a shows the data stream of e.g. 320 data symbols of one channel, i.e. one of the data packets input to the input multiplexer as in FIG. 1-2. If no interleaving is used then this data stream is written into a single row (resource) $RES_1$ of one or more frame memories having a write state starting at a frame start write address corresponding to the desired time offset $\Delta T(1)$ (if the concept of two write state and one read state memory as in the first embodiment is used) as shown in FIG. 3b. In this case the read means (output multiplexer OM) also reads out the data symbols one after the other in the row direction and in-between two succeeding data symbols e.g. from resource $RES_1$ a respective single data symbol from all other remaining resources is read out at the given read address. That is, for each 320 data symbols of a data packet a resource is provided which may be formed by parts of one or two frame memories depending on the desired time-offset as explained above.

FIG. 3c shows the conventional concept of interleaving a data stream using an interleaving matrix of e.g. an interleaving depth of 16 in the column direction (resulting in 20 rows). The data symbol $d_i$ are written to the matrix in the row direction and are read out in the column direction. That is, if the input stream consists of sequential symbols $d_1$, $d_2$, ..., $d_{16}$, $d_{17}$, $d_{18}$, $d_{32}$, ..., $d_{305}$, $d_{306}$, ..., $d_{320}$ then the interleaved bit stream consists of sequential data symbols $d_1$, $d_{17}$, ..., $d_{305}$, $d_2$, $d_{17}$, ..., $d_{306}$, ..., $d_{16}$, $d_{32}$, ..., $d_{320}$. This interleaved sequence must also be achieved if the data symbols are read out one after the other in the row direction from the read state memory. However, as FIG. 3d shows, if the data symbols are written to the resource (one row of one or more write state memories) in the original order in which the symbols arrive, a sequential reading out in the row direction will not achieve the desired interleaved data stream.

FIG. 3e shows one possibility of how the interleaved data stream can be generated. In the case of FIG. 3e the writing order to the resource is changed such that now every succeeding 20 data symbols correspond to the data symbols which would be contained in respective columns in the interleaving matrix shown in FIG. 3c. As FIG. 3f shows, due to changing the writing order, one resource now contains sequentially the data symbols of the transposed columns $C1^T, C2^T, C3^T, \ldots, C16^T$ of the interleaving matrix. Thus, during the reading of the resource from left to right the interleaved data symbol stream is read out.

Of course, in-between two succeeding readings from one resource one respective data symbol is read out from all other resources. As explained above, the reading is always performed in the column direction and after reading one data symbol from the highest numbered resource the reading is continued with the next data symbol in the first column etc. This means that despite the columnwise reading of the data symbols one resource overall is read out sequentially in the row direction. This is also true for reading the data symbols which have been written to the resource using the interleaved writing order.

Of course, it will be appreciated that it is also possible to keep the writing order as before, i.e. to sequentially write the data symbols to the respective resource as in FIG. 3d and to change the reading order. That is, whenever a further symbol is read from a resource a new 'interleaved' read address is provided.

FOURTH EMBODIMENT (SYMBOL-WISE STORAGE)

As explained above in the first to third embodiment, the data symbols may comprise a number of N data bits which are stored separately at each memory location, i.e. at each memory location of a storage resource formed by one row of the data frame (as in FIGS. 2-1, 2-2 and 2-3) or at each memory location of a storage resource formed by an interleaving matrix IL as shown in FIG. 4-1 one bit is stored. However, for example a convolutional channel coder CC in FIG. 6 in the transmitter TX outputs several bits as one data symbol to be transmitted to the receiver (for each uncoded input bit). Furthermore, each data symbol may consist of several bits due to a I/Q digital selection also-performed prior to the inputting of the data to the input multiplexer IM.

Therefore, in fact the storage of the bits of the input stream IDBS shall be performed symbolwise rather than bitwise, in particular if an interleaving of the data symbols is to be carried out. FIG. 4-2 shows an example where the respective data bits $d_0, d_{Nw}; d_1, d_{Nw}+1; \ldots; d_{Nw}-1, d_{2Nw-1}$; are respectively stored together at one memory location $il_{00}$, $il_{01}, il_{0Nw-1} \ldots il_{0Nw-1}$. It is easily seen from FIG. 4-2 that the dimension of the interleaving matrix IL can be only one half if data bits of one data symbol comprising 2 data bits are not stored separately at two memory locations but in fact commonly in one storage location.

All explanations with respect to the reading and writing for achieving the time-offset are equally well applicable to the symbolwise storage in FIG. 4-2 such that for further details the first to fourth embodiments can be referred to. That is, in each resource of the frame memories several bits belonging to the same data symbols are stored together at one memory location.

In any such case the memory requirements would be drastically reduced, since the size of the storage resources can be reduced. A person skilled in the art will appreciate that any commercially available single port or dual port RAM can be configured such that one addressable memory location has a storage depth of two or more bits, such that the data symbols can be stored at such memory locations.

INDUSTRIAL APPLICABILITY

The time-alignment apparatus and the time-alignment method described above use as main components three or more frame memories and a cyclic switching of the read-and write states of these memories together with predetermined frame start write or read addresses. Thus, any kind of data frames from a plurality of channels can be provided with a time-offset with respect to a common synchronization clock.

If the telecommunication system performs convolutional channel encoding and interleaving, the time-alignment apparatus and the time-alignment method according to the invention can be advantageously applied. A telecommunication system which uses such a channel encoding and decoding as well as an interleaving and de-interleaving can for example be a base transmitter station BTS of a CDMA telecommunication system as generally indicated in FIGS. 5, 6. Furthermore, it should be noted that in all above examples and embodiments the row and column direction can be exchanged without any loss of generality.

Furthermore, it should be understood that the invention is not limited to the above-described embodiments and examples which are presently considered as the best mode of the invention. However, a skilled person on the basis of the above teachings can derive other variations and modifications of the invention. However, all these modifications and variations fall within the scope of the appended claims. Furthermore, the invention can comprise embodiments which consist of features which have been separately described in the above specification and/or have been separately claimed in the claims.

Furthermore, reference numerals in the claims only serve clarification purposes and do not limit the scope of the invention.

The invention claimed is:

1. A time-alignment apparatus for use with a transmitter for a telecommunication system for receiving successive data frames, each frame containing a predetermined number of data symbols, respectively from a number of channels, and for successively outputting the data symbols with a predetermined time-offset relative to a synchronization clock, comprising:
    first, second, and third read/write frame memories, each having a number of storage resources and storing the data symbols of one data frame of a respective channel, each frame memory having a write state in which data is written to said frame memory and a read state in which data is read from said frame memory;
    a control unit for cyclically switching said frame memories through first, second, and third alignment modes synchronized to said synchronization clock such that:
    in said first alignment mode, said first and second frame memories are in a write state and said third frame memory is in a read state;
    in said second alignment mode, said second and third frame memories are in a write state and said first frame memory is in a read state; and
    in said third alignment mode, said third and first frame memories are in a write state and said second frame memory is in a read state.

2. A time alignment apparatus of claim 1, further comprising:
    a write/read address circuit for providing a respective frame start write address corresponding to said time-offset for each storage resource of a frame memory having a write state, and successive read addresses for all storage resources of a frame memory having a read state;
    wherein after each mode switching, an input circuit is configured to start writing the data symbols of a newly arriving data frame of every channel into the respective storage resource of a first write state frame memory which was in a read state in the previous mode at the respective frame start write address, and to continue writing the data symbols into a corresponding storage resource of the other second frame memory having a write state at a write base address, if during the writing of the data symbols in said first frame memory the highest possible write address of the respective storage resource is reached; and
    wherein an output circuit is configured to successively read one data symbol from the respective storage resources of said frame memory having a read state at said successive read addresses.

3. A time-alignment apparatus according to claim 2, wherein said data symbols respectively comprise a plurality of data bits output by a convolutional coder, and wherein said plurality of data bits are respectively stored together at one memory position of a respective matrix of said frame memories as determined by said write addresses.

4. A time-alignment apparatus according to claim 1, wherein each storage resource is constituted by a respective row of said frame memory when the data symbols are not interleaved, and wherein an output circuit is configured to read said data symbols successively along the column direction at said read addresses.

5. A time-alignment apparatus according to claim 1, wherein said write/read address circuit is configured to provide successive write addresses to enable said input circuit to write the data symbols of a respective data frame of a channel into the storage resource of one or more frame memories having a write state in an interleaving writing order such that the data symbols are stored in the row direction as sequential sets of data symbols corresponding to the data symbols in successive columns of said interleaving matrix.

6. A transmitter of a telecommunication system further comprising one or more time-alignment apparatus according to claim 1.

7. A transmitter according to claim 6, wherein said transmitter is a CDMA-transmitter.

8. A telecommunication system comprising one or more transmitters according to claim 6.

9. A telecommunication system according to claim 8, wherein said telecommunication system performs communications using a CDMA technique.

10. A time-alignment apparatus according to claim 1, wherein more than three frame memories are used and a cyclic switching is carried out with one frame memory having a read state and the other frame memories having a write state.

11. A method for time-aligning successive data frames, each frame containing a predetermined number of data symbols on a number of channels, and for successively outputting the data symbols with a predetermined time-offset relative to a synchronization clock, comprising:

writing data frames into first, second, and third read/write frame memories, each having a number of storage resources, each for storing the data symbols of one data frame of a respective channel, and each having a write state in which data is written to said frame memory and a read state in which data is read from said frame memory;

cyclically switching said frame memories through first, second, and third alignment modes synchronized to said synchronization clock, wherein:

in said first alignment mode, said first and second frame memories are in a write state and said third frame memory is in a read state;

in said second alignment mode, said second and third frame memories are in a write state and said first frame memory is in a read state; and in said third alignment mode, said third and first frame memories are in a write state and said second frame memory is in a read state.

12. A method of claim 11, further comprising:

providing a respective frame start write address corresponding to said time-offset selectively for each storage resource of a frame memory having a write state, and successive read addresses commonly for all storage resources of a frame memory having a read state;

writing, after each mode switching, the data symbols of a newly arriving data frame of every channel into the respective storage resource of a first write state frame memory which was in a read state in the previous mode at the respective frame start write address, and continuing said writing of the data symbols into a corresponding storage resource of the other second frame memory having a write state a write base address, if during the writing of the data symbols in said first frame memory the highest possible write address of the respective storage resource is reached; and successively reading one data symbol from the respective storage resources of said frame memory having a read state at said successive read addresses.

13. A method according to claim 12, wherein said data frames are written to a respective row of a respective frame memory when the data symbols are not interleaved, wherein said data symbols are successively read along the column direction at said read addresses.

14. A method according to claim 12, wherein said data symbols of a respective data frame of a channel are written into the storage resource of one or more frame memories having a write state in an interleaving writing order such that the data symbols are stored in the row direction as sequential sets of data symbols corresponding to the data symbols in successive columns of an interleaving matrix.

15. A method according to claim 12, wherein said data symbols respectively comprise a plurality of data bits output by a convolutional coder of an encoder, wherein said plurality of data bits are respectively stored together at one memory position of a respective matrix of said frame memories as determined by said write addresses.

16. A method according to claim 12, wherein more than three frame memories are used and a cyclic switching is carried out with one frame memory having a read state and the other frame memories having a write state.

17. A time-alignment apparatus for use with a transmitter of a telecommunication system for receiving successive data frames, each containing a predetermined number of data symbols, respectively from a number of channels, and for successively outputting the data symbols with a predetermined time-offset relative to a synchronization clock, comprising:

first, second, and third read/write frame memories, each having a number of storage resources, each for storing the data symbols of one data frame of a respective channel, and each having a write state in which data is written to said frame memory and a read state in which data is read from said frame memory;

a control unit for cyclically switching said frame memories through first, second, and third alignment modes synchronized to said synchronization clock such that:

in said first alignment mode, said first and second frame memories are in a read state and said third frame memory is in a write state;

in said second alignment mode, said second and third frame memories are in a read state and said first frame memory is in a write state; and in said third alignment mode, said third and first frame memories are in a read state and said second frame memory is in a write state.

18. An apparatus of claim 17, further comprising:

a write/read address providing circuit for providing a respective frame start read address corresponding to said time-offset individually for each storage resource of a frame memory having a read state, and successive write addresses commonly for all storage resources of the frame memory having a write state;

wherein after each mode switching an input circuit is configured to successively write the data symbols of a newly arriving data frame of every channel into the respective storage resource of the frame memory having a write state at said successive write addresses; and wherein an output circuit is configured to read one data symbol from the respective storage resources of a first frame memory which was in a write state in the previous mode at the respective frame start read address, and to continue reading the data symbols from a corresponding storage resource of the other second frame memory having a read state at a read base address, if during the reading of the data symbols in said first frame memory the highest possible read address of the respective storage resource is reached.

19. A method for time-aligning successive data frames, each containing a predetermined number of data symbols respectively from a number of channels, and for successively outputting the data symbols with a predetermined time-offset and for successively outputting the data symbols with a predetermined time-offset relative to a synchronization clock, comprising:

writing data frames into first, second, and third read/write frame memories, each having a number of storage resources, each for storing the data symbols of one data frame of a respective channel, and each having a write state in which data is written to said frame memory and a read state in which data is read from said frame memory;

cyclically switching said frame memories through first, second, and third alignment modes synchronized to said synchronization clock such that:

in said first alignment mode, said first and second frame memories are in a read state and said third frame memory is in a write state;

in said second alignment mode, said second and third frame memories are in a read state and said first frame memory is in a write state; and in said third alignment mode, said third and first frame memories are in a read state and said second frame memory is in a write state.

20. A method of claim 19, further comprising:
providing a respective frame start read address corresponding to said time-offset selectively for each storage resource of a frame memory having a read state, and successive write addresses commonly for all storage resources of the frame memory having a write state;
successively writing after each mode switching the data symbols of a newly arriving data frame of every channel into the respective storage resource of the frame memory having a write state at said successive write addresses; and
reading one data symbol from the respective storage resources of a first frame memory which was in a write state in the previous mode at the respective frame start read address, and continuing the reading of the data symbols from a corresponding storage resource of the other second frame memory having a read state at a read base address, if during the reading of the data symbols in said first frame memory the highest possible read address of the respective storage resource is reached.

21. A time-alignment apparatus for use with a transmitter of a telecommunication system for receiving successive data frames each containing a predetermined number of data symbols respectively from a number of channels and for successively outputting the data symbols with a predetermined time-offset relative to a synchronization clock, comprising:
first, second, and third read/write frame memories, each having a number of storage resources, each for storing the data symbols of one data frame of a respective channel, and each having a write state in which data is written to said frame memory and a read state in which data is read from said frame memory;
a control unit for cyclically switching said frame memories through first, second, and third alignment modes synchronized to said synchronization clock such that:
in said first alignment mode, said first and second frame memories are in a write state and said third frame memory is in a read state;
in said second alignment mode, said second and third frame memory are in a write state and said first frame memory is in a read state; and
in said third alignment mode, said third and first frame memory are in a write state and said second frame memory is in a read state,
wherein more than three frame memories are used and a cyclic switching is carried out with one frame memory having a read state and the other frame memories having a write state.

22. A time alignment apparatus of claim 21, further comprising:
a write/read address providing circuit for providing a respective frame start write address corresponding to said time-offset individually for each storage resource of a frame memory having a write state, and successive read addresses commonly for all storage resources of a frame memory having a read state;
wherein after each mode switching, an input device starts writing the data symbols of a newly arriving data frame of every channel into the respective storage resource of a first write state frame memory which was in a read state in the previous mode at the respective frame start write address, and continues writing the data symbols into a corresponding storage resource of the other second frame memory having a write state at a write base address, if during the writing of the data symbols in said first frame memory the highest possible write address of the respective storage resource is reached; and
wherein an output device successively reads one data symbol from the respective storage resources of said frame memory having a read state at said successive read addresses.

23. A method for time-aligning successive data frames, each containing a predetermined number of data symbols on a number of channels, and for successively outputting the data symbols with a predetermined time-offset relative to a synchronization clock, comprising:
writing data frames into first, second, and third read/write frame memories each having a number of storage resources, each for storing the data symbols of one data frame of a respective channel, and each having a write state in which data is written to said frame memory and a read state in which data is read from said frame memory;
cyclically switching said frame memories through first, second, and third alignment modes synchronized to said synchronization clock, wherein:
in said first alignment mode, said first and second frame memories are in a write state and said third frame memory is in a read state;
in said second alignment mode, said second and third frame memories are in a write state and said first frame memory is in a read state; and
in said third alignment mode, said third and first frame memories are in a write state and said second frame memory is in a read state; and
wherein more than three frame memories are used and cyclic switching is carried out with one frame memory having a read state and the other frame memories having a write state.

24. A method of claim 23, further comprising:
providing a respective frame start write address corresponding to said time-offset selectively for each storage resource of a frame memory having a write state, and successive read addresses commonly for all storage resources of a frame memory having a read state;
writing, after each mode switching the data symbols of a newly arriving data frame of every channel into the respective storage resource of a first write state frame memory which was in a read state in the previous mode at the respective frame start write address, and continuing said writing of the data symbols into a corresponding storage resource of the other second frame memory having a write state a write base address, if during the writing of the data symbols in said first frame memory the highest possible write address of the respective storage resource is reached; and
successively reading one data symbol from the respective storage resources of said frame memory having a read state at said successive read addresses.

* * * * *